(12) United States Patent
Moffatt et al.

(10) Patent No.: US 10,931,149 B2
(45) Date of Patent: Feb. 23, 2021

(54) WIRELESS POWER RECEIVER CIRCUITS THAT PROVIDE CONSTANT VOLTAGE OR CURRENT TO AN ELECTRICAL LOAD, AND METHODS

(71) Applicant: Etherdyne Technologies, Inc., Daly City, CA (US)

(72) Inventors: Robert A. Moffatt, Palo Alto, CA (US); Jeffrey J. Yen, Palo Alto, CA (US)

(73) Assignee: ETHERDYNE TECHNOLOGIES, INC., Daly City, CA (US)

( * ) Notice: Subject to any disclaimer, the term of this patent is extended or adjusted under 35 U.S.C. 154(b) by 193 days.

(21) Appl. No.: 16/023,925

(22) Filed: Jun. 29, 2018

(65) Prior Publication Data

US 2020/0006987 A1    Jan. 2, 2020

(51) Int. Cl.
*H02J 50/20*     (2016.01)
*H02J 50/12*     (2016.01)
*H02J 7/02*      (2016.01)
*H02J 7/34*      (2006.01)
*H02M 7/06*      (2006.01)

(52) U.S. Cl.
CPC .............. *H02J 50/20* (2016.02); *H02J 7/025* (2013.01); *H02J 50/12* (2016.02); *H02J 7/345* (2013.01); *H02M 7/06* (2013.01)

(58) Field of Classification Search
CPC .. H02J 50/20; H02J 50/12; H02J 7/025; H02J 7/345; H02M 7/06
See application file for complete search history.

(56) References Cited

U.S. PATENT DOCUMENTS

| 8,228,027 B2 | 7/2012 | Gao | |
|---|---|---|---|
| 2010/0327804 A1* | 12/2010 | Takahashi | H02J 50/12 320/108 |
| 2011/0199046 A1 | 8/2011 | Tsai et al. | |

(Continued)

FOREIGN PATENT DOCUMENTS

| EP | 0865141 | 9/1998 |
|---|---|---|
| EP | 2267865 | 12/2010 |

(Continued)

OTHER PUBLICATIONS

International Search Report and Written Opinion dated Oct. 2, 2019 for PCT Patent Application PCT/US19/39387.

(Continued)

*Primary Examiner* — Carlos Amaya
(74) *Attorney, Agent, or Firm* — Thomas|Horstemeyer, LLP

(57) ABSTRACT

Wireless power receiver circuits and methods for use in wireless power transfer systems are provided for providing a constant current or voltage, depending on which is needed, to an electrical load. The wireless power receiver circuits are configured to shut down the resonant responses of the receiver circuits when electrical power is not needed by the load to reduce power consumption and avoid unnecessary heat dissipation. Additionally, a switching device of the wireless power receiver circuit that is used for shutting down the resonant response can operate at relatively low frequencies, and consequently, can be implemented using relatively low-speed, relatively inexpensive components.

25 Claims, 21 Drawing Sheets

(56) References Cited

U.S. PATENT DOCUMENTS

| | | |
|---|---|---|
| 2012/0153903 A1 | 6/2012 | Kim et al. |
| 2012/0309306 A1 | 12/2012 | Kim et al. |
| 2013/0099588 A1 | 4/2013 | Yeo et al. |
| 2013/0099591 A1* | 4/2013 | Yeo ............... H02M 7/217 307/104 |
| 2014/0159500 A1 | 6/2014 | Sankar et al. |
| 2014/0265899 A1* | 9/2014 | Sadwick ......... H05B 45/395 315/200 R |
| 2015/0130292 A1 | 5/2015 | Yeon et al. |
| 2015/0303824 A1 | 10/2015 | Celani et al. |
| 2015/0311742 A1 | 10/2015 | Hatanaka et al. |
| 2015/0372493 A1 | 12/2015 | Sankar et al. |
| 2016/0226296 A1* | 8/2016 | Bae ............... H02J 50/80 |
| 2016/0268815 A1 | 9/2016 | Lee et al. |
| 2016/0336811 A1 | 11/2016 | Liu et al. |
| 2017/0070082 A1 | 3/2017 | Zheng et al. |
| 2017/0149282 A1 | 5/2017 | Menegoli et al. |

FOREIGN PATENT DOCUMENTS

| | | |
|---|---|---|
| JP | H10108390 | 4/1998 |
| JP | 2000287375 | 10/2000 |
| TW | I542110 B | 7/2016 |
| WO | 2016049579 | 3/2016 |

OTHER PUBLICATIONS

UK Examination Report dated Jan. 28, 2019 for Patent Application No. 1812900.7.

Kim, Se Yong, Tae Yang Kim, and Jun Rim Choi. "Integrated Chip Current Mode DC-DC Buck Converter for Wireless Power Receiver." Proceedings of the 10th ICEENG Conference. vol. 19. 2016.

Taiwanese Office Action dated Apr. 23, 2020 for Taiwanese Patent Application No. 108123056.

* cited by examiner

US 10,931,149 B2

WIRELESS POWER RECEIVER CIRCUITS THAT PROVIDE CONSTANT VOLTAGE OR CURRENT TO AN ELECTRICAL LOAD, AND METHODS

CROSS-REFERENCE TO RELATED APPLICATIONS

The present application has subject matter that is related to subject matter disclosed in U.S. patent application Ser. No. 15/296,704, filed on Oct. 18, 2016, entitled "Wireless Power Transfer To Multiple Receiver Devices Across A Variable-Sized Area," and to subject matter disclosed in U.S. patent application Ser. No. 15/644,802, filed on Jul. 9, 2017, entitled "Integrated Power Transmitter for Wireless Power Transfer," both of which are hereby incorporated by reference herein in their entireties.

BACKGROUND

Wireless power transfer is the transmission of electrical energy from a power source to an electrical load without the use of man-made conductors to connect the power source to the electrical load. A wireless power transfer system includes a transmitter and one or more receiver devices. The transmitter is electrically coupled to a source of power and converts the power to a time-varying electromagnetic (EM) field. The one or more receiver devices receive the power via the EM field and convert the received power back to an electric current to be utilized by an electrical load that is either part of the receiver device or is electrically coupled to the receiver device.

The receiver devices are configured to resonate at the characteristic frequency at which the transmitter is operating in order to receive power from the near EM field. The receiver devices convert the received power from the near EM field into an electrical current that can then be used to power an electrical load that is part of, or that is electrically coupled to, the receiver device.

One of the difficulties associated with current receiver devices used in wireless power transfer systems is ensuring that a constant voltage or current, depending on which is needed, is provided to the electrical load. Another difficulty associated with current receiver devices used in wireless power transfer systems is the lack of a mechanism for shutting down the resonant response of the receiver device when electrical power is not needed by the load. If the resonant response is not shut down when power is not needed, the receiver device will waste power and dissipate heat whenever the load is not using a large fraction of the available power. In known receiver devices that provide a mechanism for shutting down the resonant response, the mechanism typically includes a high-speed switching circuit implemented using expensive high-speed components.

A need exists for a receiver device for use in wireless power transfer systems that is capable of providing a constant current or voltage, depending on which is needed, to the load. A need exists for a receiver device for use in wireless power transfer systems that is capable of shutting down the resonant response when electrical power is not needed by the load to reduce power consumption and avoid unnecessary heat dissipation.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
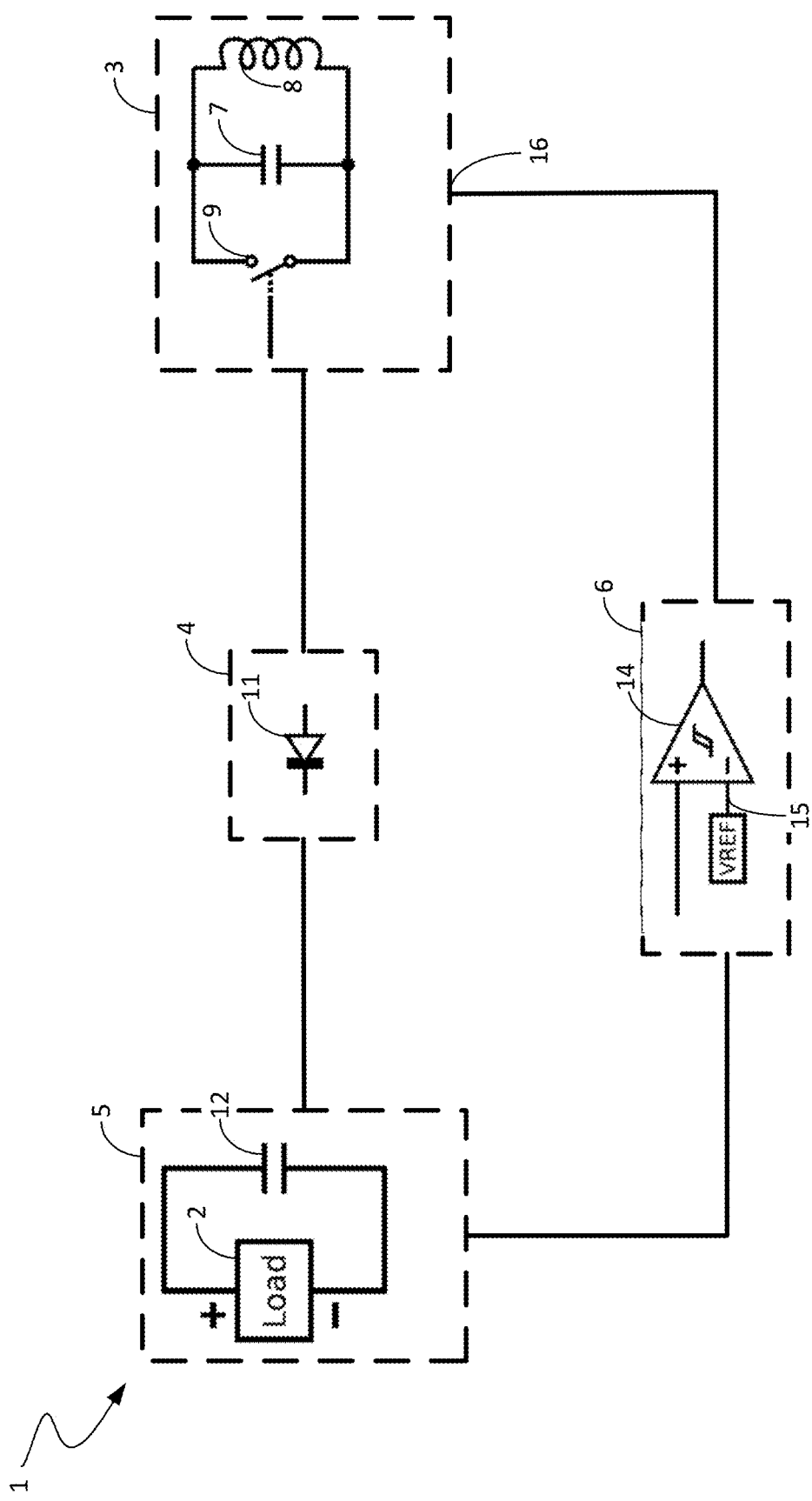
FIG. 1 is a block diagram of a wireless power receiver circuit in accordance with a representative embodiment that may be used to receive power wirelessly in a wireless power transfer system.

In accordance with representative embodiments described herein, wireless power receiver circuits for use in wireless power transfer systems are provided that provide a constant current or voltage, depending on which is needed, to an electrical load. The wireless power receiver circuits are configured to shut down the resonant response when electrical power is not needed by the load to reduce power consumption and avoid unnecessary heat dissipation. Additionally, a switching device of the wireless power receiver circuit that is used for shutting down the resonant response can operate at relatively low frequencies. Consequently, the switching device can be implemented at relatively low cost using relatively low-speed, inexpensive components.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. Relative terms may be used to describe the various elements' relationships to one another, as illustrated in the accompanying drawings. These relative terms are intended to encompass different orientations of the device and/or elements in addition to the orientation depicted in the drawings.

The term "constant voltage," as that term is used herein, means that the voltage is substantially constant in that it does not vary over time by more than about 10% from its average value. Similarly, the term "constant current," as that term is used herein, means that the current is substantially constant in that it does not vary over time by more than about 10% from its average value. Representative embodiments described herein are directed to a receiver device that delivers a constant voltage or a constant current, depending on which is needed or desired, to an electrical load that is electrically coupled to the receiver device.

Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than electrical connectors (e.g., wires, bonding materials, etc.). The phrase "electrically coupled to," as that phrase is used herein, can denote a wireless electromagnetic coupling between two devices or a wired connection between two devices, with or without intermediate devices employed to interconnect the two devices.

FIG. 1 is a block diagram of a wireless power receiver circuit 1 that may be used to receive power wirelessly in a wireless power transfer system, such as, for example, the wireless power transfer system 100 disclosed in the aforementioned U.S. application Ser. No. 15/296,704 (hereinafter "the '704 application") to wirelessly receive power from a wireless power transmitter. In FIG. 1, the wireless power receiver circuit 1 is a pulse-width-modulated (PWM) wireless power receiver circuit represented by a combination of four functional blocks 3-6, each of which performs one or more functions and has at least one input and one output.

Block 3 is an LC resonator circuit comprising at least a capacitor 7 and an inductor 8 connected in parallel, and an electrically-controllable switch 9. The electrically-controllable switch 9 is activated by an output signal of block 6, as will be described below in more detail. In accordance with this representative embodiment, when the electrically-controllable switch 9 is in an opened state, the LC resonator circuit receives RF power from an ambient magnetic field and outputs RF power. The RF power output from block 3 is fed into an input terminal of block 4, which is an RF rectifier circuit that rectifies the RF power, converting it into DC power. In FIG. 1, the RF rectifier circuit is represented by a diode 11. The DC power output from block 4 is fed into an input terminal of block 5, which comprises an energy storage device 12 connected in parallel with the DC load 2. For illustrative purposes, the energy storage device 12 is represented in FIG. 1 by a single capacitor.

Block 5 outputs an output signal at an output terminal thereof to block 6. The output signal is proportional to a parameter (either voltage or current) that is intended to be regulated so as to remain substantially constant. As will be described below in more detail, in some cases the wireless power receiver circuit 1 is configured to deliver a substantially constant DC current to the DC load 2, and in other cases the wireless power receiver circuit 1 is configured to deliver a substantially constant DC voltage to the DC load 2.

The output signal from block 5 is fed as an input signal into an input terminal of block 6, which comprises a comparator 14 having a preselected amount of hysteresis and a reference terminal 15. The comparator 14 compares the input signal to a reference signal received at the reference terminal 15 and outputs a control signal having a value that is based on whether the input signal is greater than the reference signal or is less than or equal to the reference signal. The control signal output from block 6 is fed into a control signal input terminal 16 of block 3. As indicated above, the state of the electrically-controllable switch 9 is controlled (i.e., activated or deactivated) based on the value of the control signal output from block 6 and input to block 3. The electrically-controllable switch 9 may be any voltage-controlled switch, such as, for example, a metal oxide semiconductor field effect transistor (MOSFET), a relay, a complementary metal oxide semiconductor (CMOS), an RF switch, etc.

The closed feedback loop comprising the four blocks 3-6 acts to regulate the load parameter measured by the signal that is output from block 5 so as to ensure that either a substantially constant current or voltage is delivered the DC load 2, even if the load impedance or the ambient magnetic field strength are varied.

The circuit 1 has two states depending on the state of the electrically-controllable switch 9: idle state (switch 9 is in a first state, e.g., switch 9 is closed); active state (switch 9 is in a second state, e.g., switch 9 is open). In accordance with this representative embodiment, the first state of switch 9 is the closed state and the second state of switch 9 is the opened state and the idle and active states of the receiver circuit 1 correspond to the closed and opened states, respectively, of the switch 9. It should be noted that the opposite could be true in other embodiments. For purposes of demonstrating the inventive principles and concepts, the following discussion assumes that the circuit 1 is in the active state when switch 9 is in the opened state and is in the idle state when switch 9 is in the closed state.

When the circuit 1 is in the active state, switch 9 is turned off (the opened state), and the LC resonator circuit 3 receives power due to the induced voltage, Vind, causing an RF voltage to appear across capacitor 7. There will be an initial ring-up period as the LC resonator circuit 3 builds up energy. Once the RF voltage across capacitor 7 reaches a sufficiently high amplitude to begin forward-biasing a rectifier circuit 4, the circuit 1 enters a charging period. The rectifier circuit 4 rectifies the RF voltage across capacitor 7 and charges the capacitor 12 of block 5, causing its DC voltage to slowly rise. When the voltage on the non-inverting input terminal of comparator 14 exceeds the voltage reference, VREF, the output of the comparator 14 switches to its maximum output value (e.g., a logic level High), which causes the electrically-controllable switch 9 to turn on (the closed state). At this point, the circuit 1 enters the idle state.

When the switch 9 is turned on, it shorts the capacitor 7 to ground and the RF voltage across capacitor 7 drops to a very low level. The rectifier diode 11 is then reverse-biased, and prevents the capacitor 12 from discharging through the inductor 8. The capacitor 12 slowly discharges through the load 21, causing the voltage across the capacitor 12 to drop. The comparator 14 is designed to have a preselected amount of hysteresis so that it does not immediately change state when the voltage on the non-inverting input terminal of comparator 14 begins to drop. Once the voltage on the non-inverting input terminal of capacitor C3 29 drops by a certain amount, ΔV, set by the hysteresis, the comparator 14 changes state and outputs its minimum output value (e.g., a logic level low). At this point, the electrically-controllable switch 9 is turned off. The circuit 1 re-enters the active state, and the cycle repeats.

It can be seen from the above description that the LC resonator circuit is shut down during the idle period, and does not receive power or dissipate heat. This allows the receiver circuit 1 to operate in a wide dynamic range of ambient magnetic field strengths. In a weak magnetic field, the receiver circuit 1 will be in the active state for a large percentage of the PWM cycle. In a strong magnetic field, the receiver circuit 1 will be in the idle state for a large percentage of the PWM cycle. In the idle state, the LC resonator circuit is detuned, or non-resonant. It therefore has a very weak and/or negligible resonant response to the ambient magnetic field, and will not receive power or dissipate heat. In other words, the resonant response of the receiver circuit 1 is shut down during the idle period to prevent the receiver circuit 1 from receiving power and from dissipating heat. The lack of heat dissipation during the idle period improves both the safety and the efficiency of the receiver circuit 1.

Each of the blocks 3-6 of the wireless power receiver circuit 1 can have a variety of configurations. Several examples of wireless power receiver circuits that perform the functions and that have the features described above with reference to FIG. 1 will now be described with reference to FIGS. 2-21. It should be noted that the inventive principles and concepts are not limited to the examples shown in FIGS. 2-21 and that a variety of wireless power receiver circuits not specifically shown and described herein can be created that have the features and perform the functions described above with reference to FIG. 1. It should also be noted that the wireless power receiver devices disclosed herein are not limited to being used with any particular wireless power transmitter, but may be used with any suitable wireless power transmitter and in any suitable wireless power transfer system.

Figure 2:
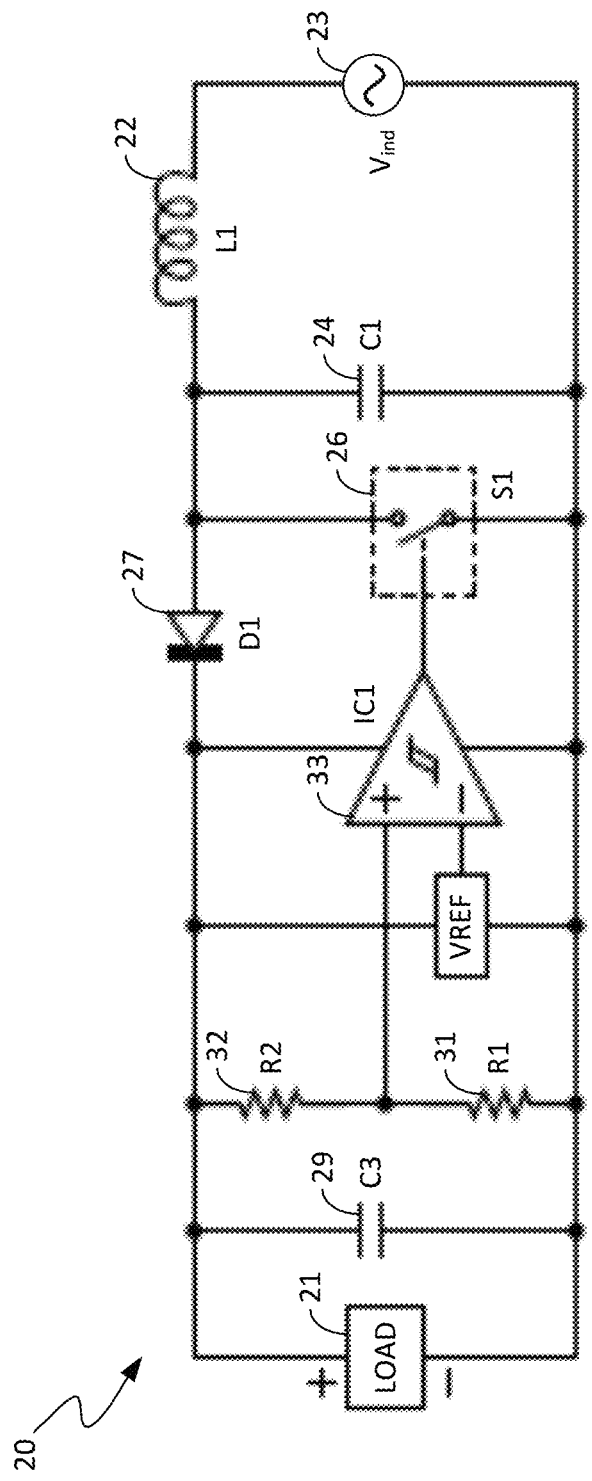
FIG. 2 is a schematic diagram of a wireless power receiver circuit in accordance with a representative embodiment that may be used to receive power wirelessly in a wireless power transfer system.

FIG. 2 is a schematic diagram of a wireless power receiver circuit 20 in accordance with a representative embodiment that may be used to receive power wirelessly in a wireless power transfer system, such as, for example, the wireless power transfer system 100 disclosed in the '704 application. In accordance with this representative embodiment, the wireless power receiver circuit 20 is a PWM wireless power receiver circuit that provides a constant voltage to an electrical load 21. An ambient magnetic field drives the inductor, L1 22, and induces a voltage, Vind, represented in FIG. 2 by an RF voltage source 23 in series with inductor L1 22. Assuming B denotes the component of the ambient magnetic field that is parallel to the dipole moment of the inductor, L1 22, the capacitor, C1 24, in combination with inductor, L1 22, forms a resonant LC tank circuit that is tuned to resonate at the frequency of oscillation of the ambient magnetic field, B.

The circuit 20 has two states depending on the state of an electrically-controllable switch, S1 26: active (switch S1 26 is off) and idle (switch S1 26 is on). The switch S1 26 may be any voltage-controlled switch, such as, for example, one or more MOSFET transistors, a relay, one or more CMOS transistors, an RF switch, etc. When the circuit 20 is in the active state, switch S1 26 is turned off, and the tank circuit comprising L1 22 and C1 24 receives power due to the induced voltage, Vind, causing an RF voltage to appear across capacitor, C1 24. There will be an initial ring-up period as the LC tank circuit builds up energy.

Figure 3:
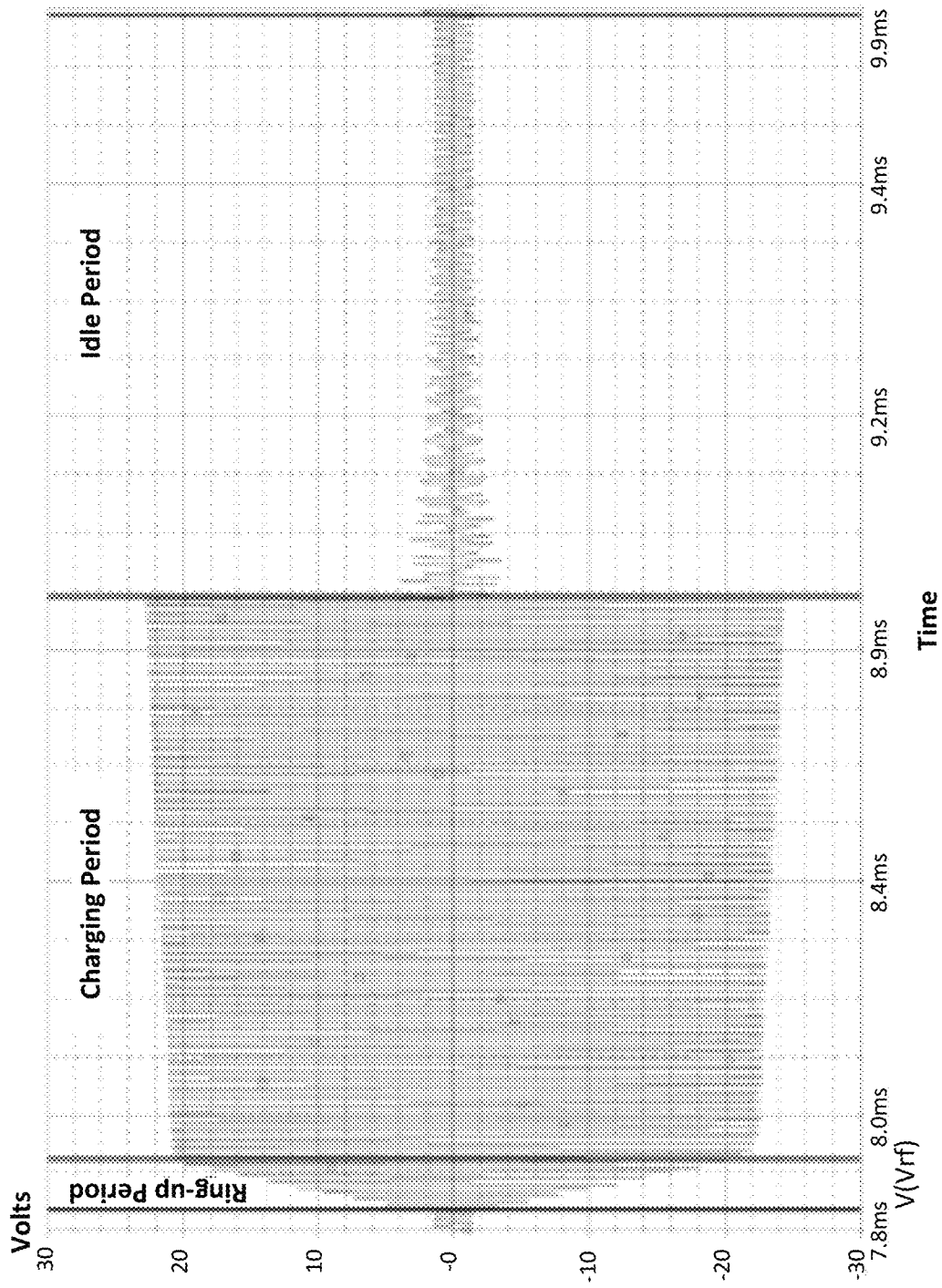
FIG. 3 is a plot of the voltage across capacitor C1 shown in FIG. 2 as a function of time demonstrating that once the RF voltage across capacitor C1 reaches a sufficiently high amplitude to begin forward-biasing rectifier diode D1 of the receiver circuit shown in FIG. 1, the receiver circuit enters a charging period.

FIG. 3 is a plot of the voltage across capacitor C1 24 as a function of time. Once the RF voltage across capacitor C1 24 reaches a sufficiently high amplitude to begin forward-biasing a rectifier diode, D1 27, the circuit 20 enters a charging period. The rectifier diode D1 27 rectifies the RF voltage across C1 24 and charges a capacitor C3 29, causing its DC voltage to slowly rise. Two resistors, R1 31 and R2 32, form a resistive voltage divider that provides a fraction of the voltage across capacitor C3 29 to the non-inverting input terminal of a comparator, IC 33. When the voltage on the non-inverting input terminal of comparator IC1 33 exceeds the voltage reference, VREF, the output of the comparator IC1 33 will switch to logic level high. The electrically-controllable switch S1 26 will then be turned on. At this point, the circuit 20 enters the idle state.

When the switch S1 26 is turned on, it shorts the capacitor C1 24 to ground. The switch S1 26 preferably has low resistance to ensure that the Q of the LC tank circuit is very low, and the RF voltage across capacitor C1 24 drops to a very low level. The rectifier diode D1 27 is then reverse-biased, and prevents the capacitor C3 29 from discharging through the inductor L1 22. The capacitor C3 29 slowly discharges through the load 21, causing its voltage to drop.

In accordance with this representative embodiment, the comparator IC1 33 is designed to have a preselected amount of hysteresis so that it does not immediately change state when the voltage on the non-inverting input terminal of comparator IC1 33 begins to drop. Once the voltage on the non-inverting input terminal of capacitor C3 29 drops by a certain amount, $\Delta V$, set by the hysteresis, the comparator IC1 33 changes state and outputs a logic level low. At this point, the electrically-controllable switch S1 26 is turned off. The circuit 20 re-enters the active state, and the cycle repeats.

It can be seen from the above description that the LC tank circuit is shut down during the idle period, and does not receive power or dissipate heat. This allows the receiver circuit 20 to operate in a wide dynamic range of ambient magnetic field strengths. In a weak magnetic field, the receiver circuit 20 will be in the active state for a large percentage of the PWM cycle. In a strong magnetic field, the receiver circuit 20 will be in the idle state for a large percentage of the PWM cycle. In the idle state, the resonator, i.e., the LC tank, is detuned, or non-resonant. It therefore has a very weak and/or negligible resonant response to the ambient magnetic field, and will not receive power or dissipate heat. In other words, the resonant response of the receiver circuit 20 is shut down during the idle period to prevent the receiver circuit 20 from receiving power and from dissipating heat. The lack of heat dissipation during the idle period improves both the safety and the efficiency of the receiver circuit 20.

Figure 4:
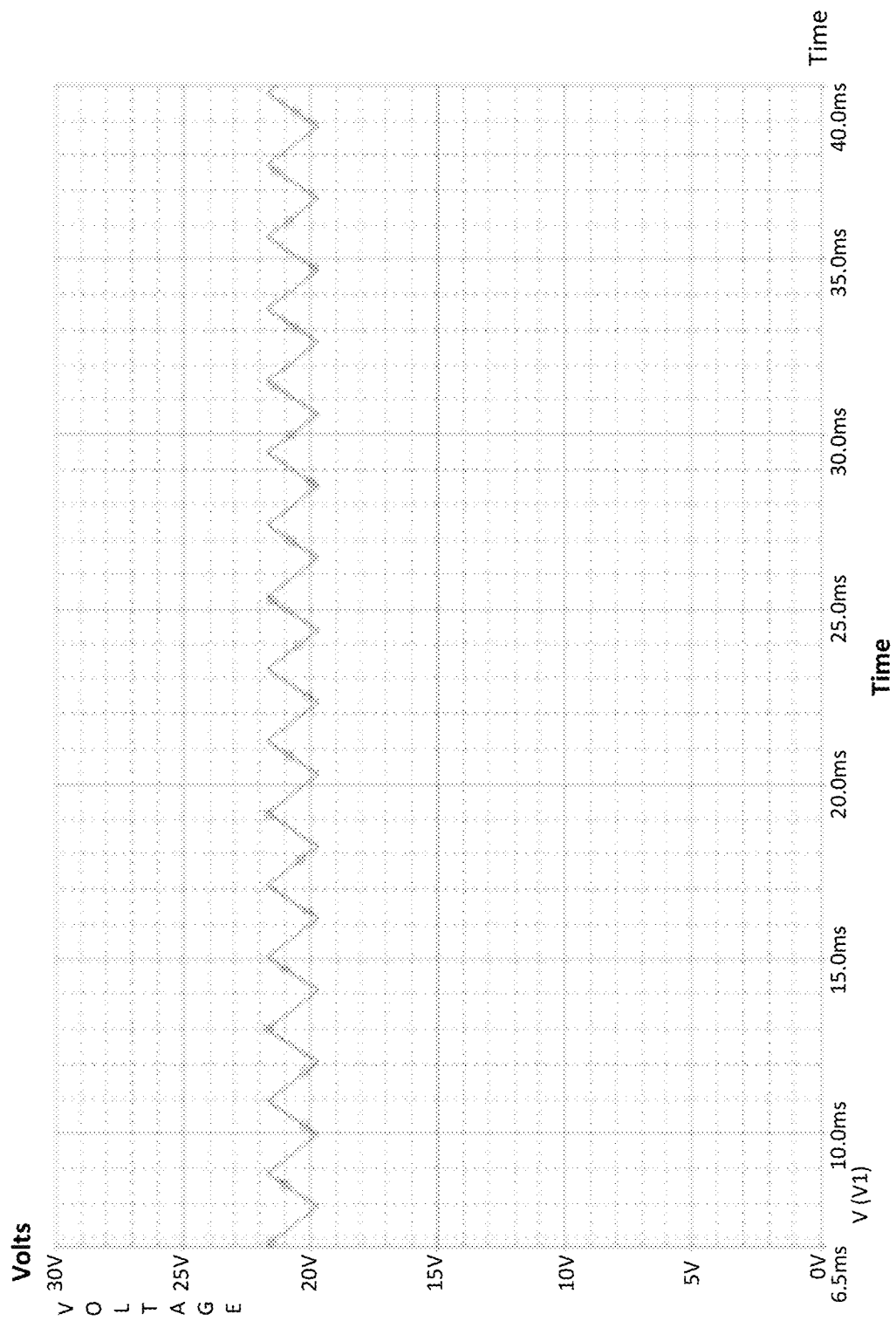
FIG. 4 is a plot of the voltage across the load of the receiver circuit shown in FIG. 2 as a function of time.

FIG. 4 is a plot of the voltage across the load 21 as a function of time. The voltage across the load 21 is regulated, and is substantially constant over time, with a small triangle-wave ripple. The voltage varies only slightly over time between about 19.9 v. and 21.7 v. In this example, the average voltage is 20.8 v. The voltage across the load 21 varies by less than 10%, and typically less than 5%, from the average load voltage. The amplitude of the ripple is set by the hysteresis of the comparator IC1 33 and may be made smaller by choosing a comparator with less hysteresis.

As indicated above, in accordance with this representative embodiment, the comparator IC1 33 is designed to have a preselected amount of hysteresis so that it does not immediately change state when the voltage on the non-inverting input terminal of comparator IC1 33 begins to drop. Rather, the comparator IC1 33 does not change state and output a logic level low until after the voltage on the non-inverting input terminal of capacitor C3 29 has dropped by a certain amount, $\Delta V$, set by the hysteresis. This feature allows the frequency of the switching of the receiver circuit 20 between the active and idle states to be significantly lower than the frequency of oscillation of the ambient magnetic field. For example, the switching frequency of the receiver circuits in accordance with the inventive principles and concepts can be 10,000 or even 100,000 times lower than that of the ambient magnetic field. Consequently, the components of the receiver circuit 20 that are involved in the switching process can be relatively slow speed, relatively inexpensive, components.

In contrast, known PWM receiver circuits do not incorporate a preselected amount of hysteresis in the comparator sufficient to allow them to operate at a substantially lower frequency than the frequency of oscillation of the ambient magnetic field. Consequently, they perform switching at a frequency that is comparable to the frequency of oscillation of the ambient magnetic field. Because this frequency can be relatively high, the circuit elements that are involved in the switching process are also relatively high-speed components, which are typically more complex and expensive than low-speed components.

Figure 5:
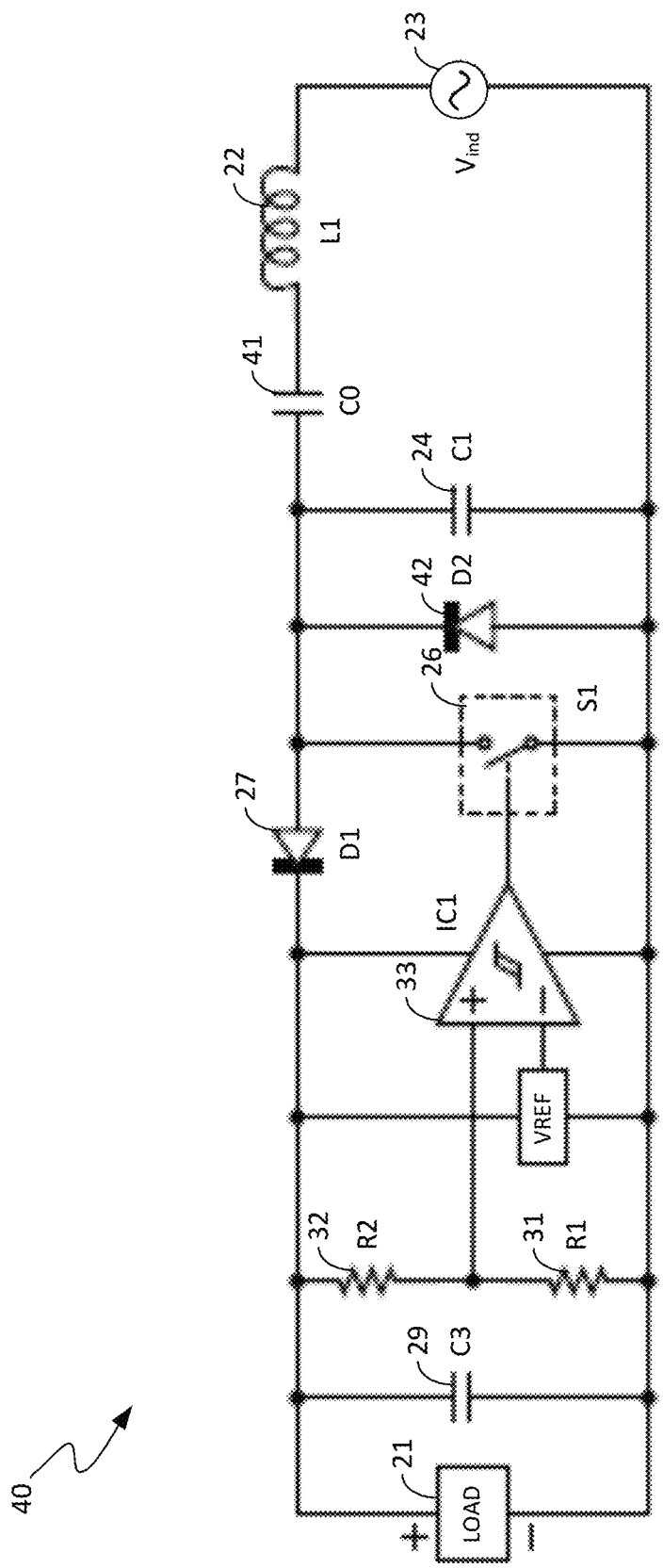
FIG. 5 is a schematic diagram of a wireless power receiver circuit in accordance with a representative embodiment that may be used to receive power wirelessly in a wireless power transfer system.

FIG. 5 is a schematic diagram of a wireless power PWM receiver circuit 40 in accordance with a representative embodiment that may be used to receive power wirelessly in a wireless power transfer system. The wireless power PWM receiver circuit 40 shown in FIG. 5 is identical to the wireless power PWM receiver circuit 20 shown in FIG. 2, except that the receiver circuit 40 shown in FIG. 5 includes an additional capacitor, C0 41, in series with the inductor, L1 22, and an additional rectifier diode D2 42 in parallel with capacitor C1 24. The operation of the receiver circuit 40 is largely the same as the operation of the receiver circuit 20 shown in FIG. 2, except that the ratio of C1 24 to C0 40 is preselected to more effectively match the impedance of the LC tank circuit comprising C1 24, L1 22, and C0 41 to that of the load 21.

Figure 6:
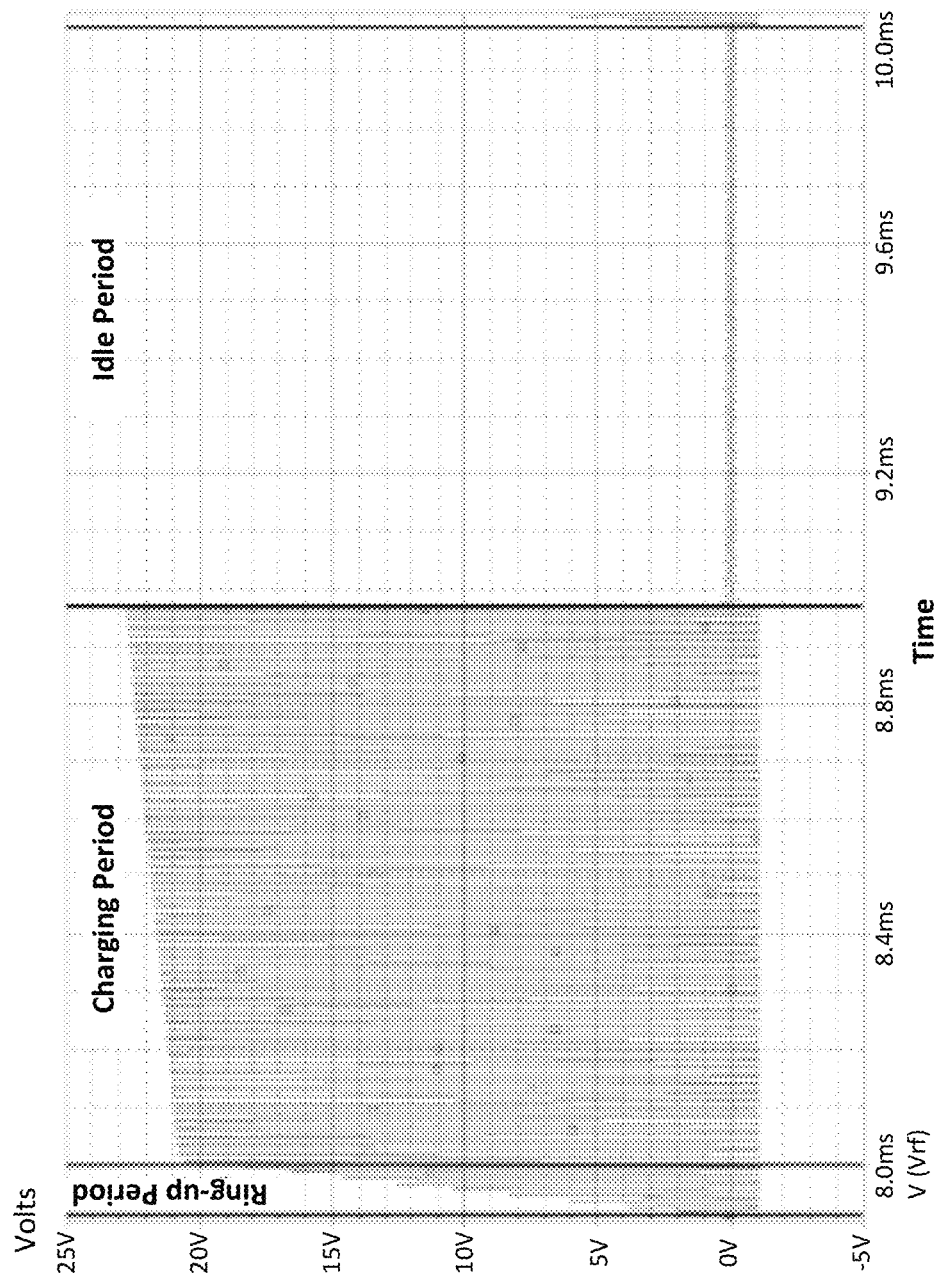
FIG. 6 is a plot of the voltage across capacitor C1 of FIG. 5 as a function of time.

FIG. 6 is a plot of the voltage across capacitor C1 24 as a function of time. The purpose of the rectifier diode D2 42 is to provide a DC path for the load current, since the capacitor C0 41 blocks this DC current from flowing through the inductor, L1 22. The rectifier diode D2 42 causes a DC charge to build up on the capacitor C1 24 during the active state, which can be seen in the waveform plotted in FIG. 6.

Figure 7:
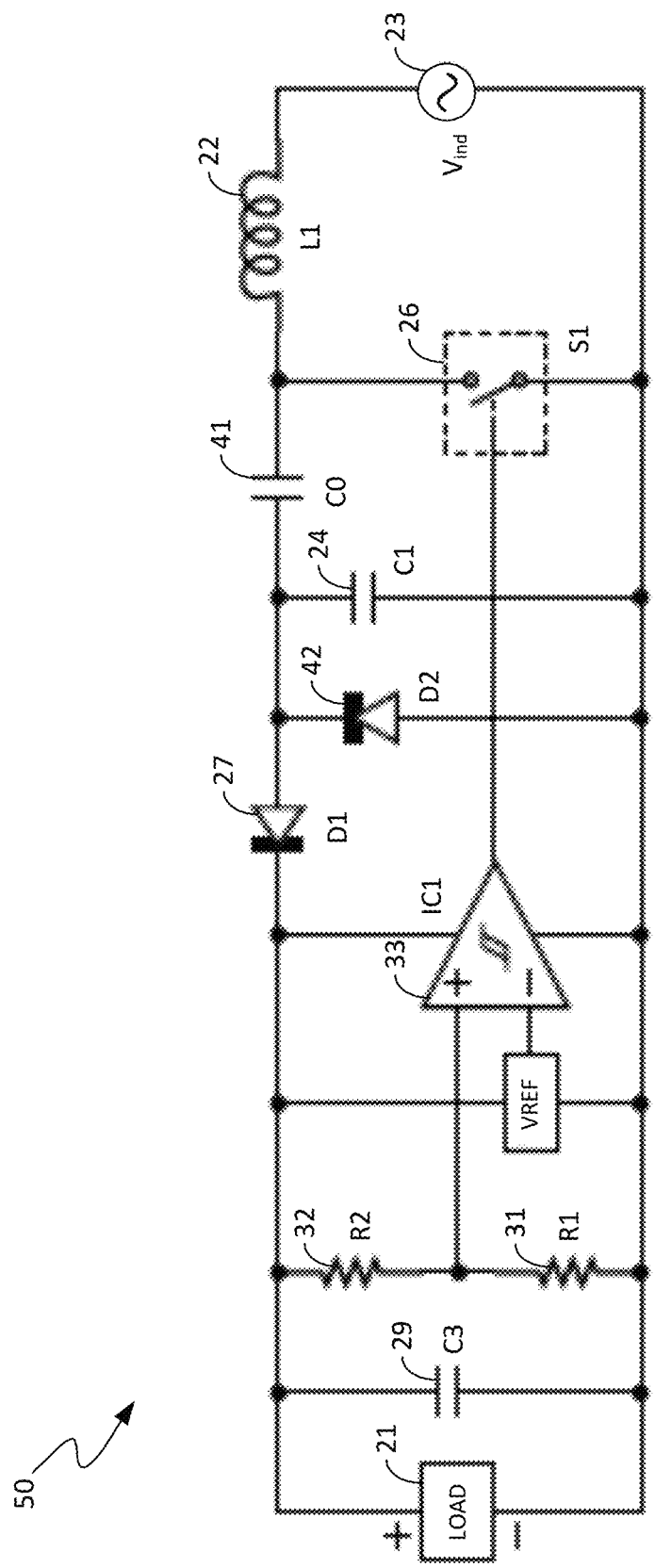
FIG. 7 is a schematic diagram of a wireless power receiver circuit in accordance with another representative embodiment that may be used to receive power wirelessly in a wireless power transfer system.

FIG. 7 is a schematic diagram of a wireless power PWM receiver circuit 50 in accordance with another representative embodiment that may be used to receive power wirelessly in a wireless power transfer system. The PWM receiver circuit 50 is identical to the PWM receiver circuit 40 shown in FIG. 5, except that the location of the switch S1 26 has been changed. The operation of the receiver circuit 50 is largely the same as the operation of the receiver circuit 20 shown in FIG. 2.

If the capacitance ratio, C1 24/C0 41, is too large, then the receiver circuit 40 shown in FIG. 5 will not be able to sufficiently detune the resonant LC tank circuit when the PWM circuit 40 is in the idle state. If the LC tank circuit is not sufficiently detuned, the induced voltage, Vind, will generate a large circulating RF current that will dissipate heat. This will not only cause a waste of power, but may also cause thermal issues in the receiver circuit 40. The receiver circuit 50 shown in FIG. 7 solves this problem by directly shorting the inductor L1 22 to ground, rather than just shorting the capacitor C1 24 to ground. This guarantees that the LC tank circuit is detuned from resonance in the idle state, regardless of the ratio of C1 to C0.

Figure 8:
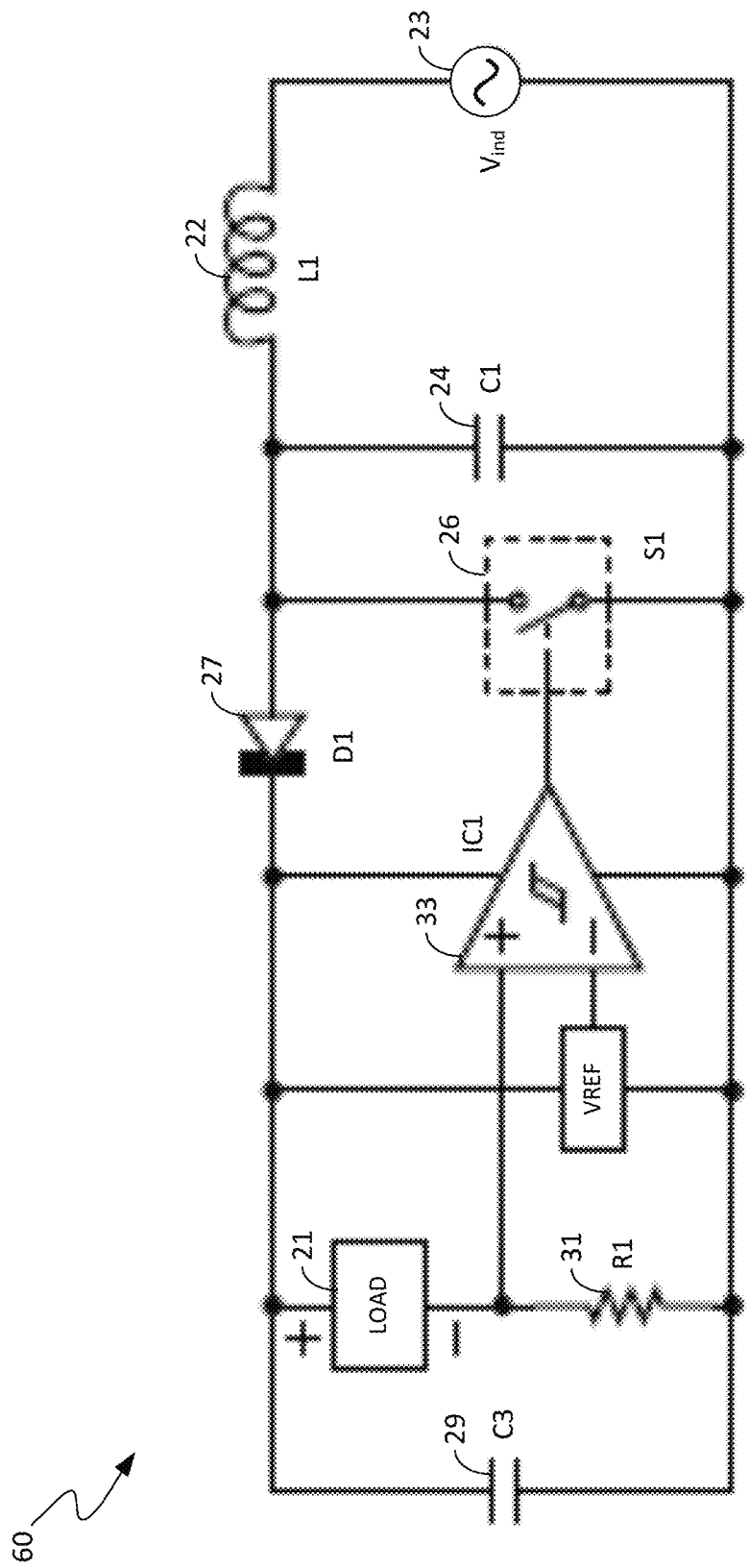
FIG. 8 is a schematic diagram of a wireless power receiver circuit in accordance with a representative embodiment that provides a constant DC current to the load of the wireless power receiver circuit.
Figure 9:
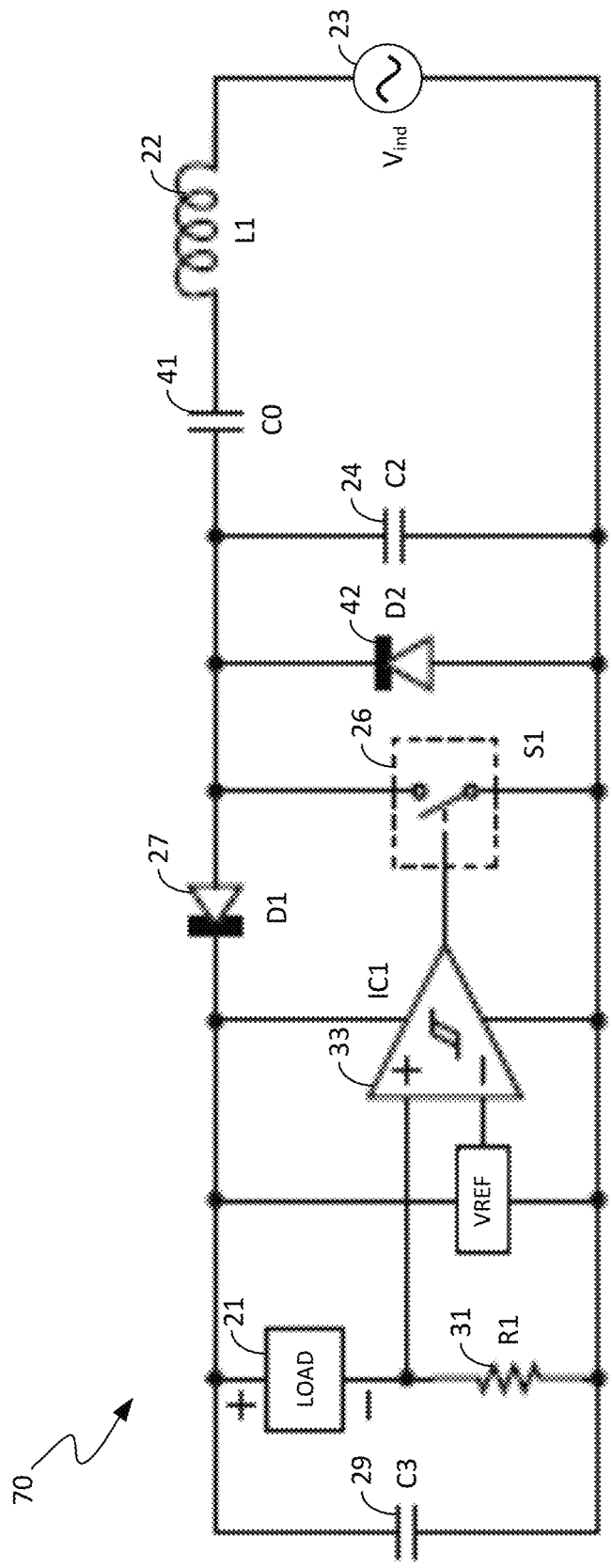
FIG. 9 is a schematic diagram of a wireless power receiver circuit in accordance with a representative embodiment that provides a constant DC current to the load of the wireless power receiver circuit.
Figure 10:
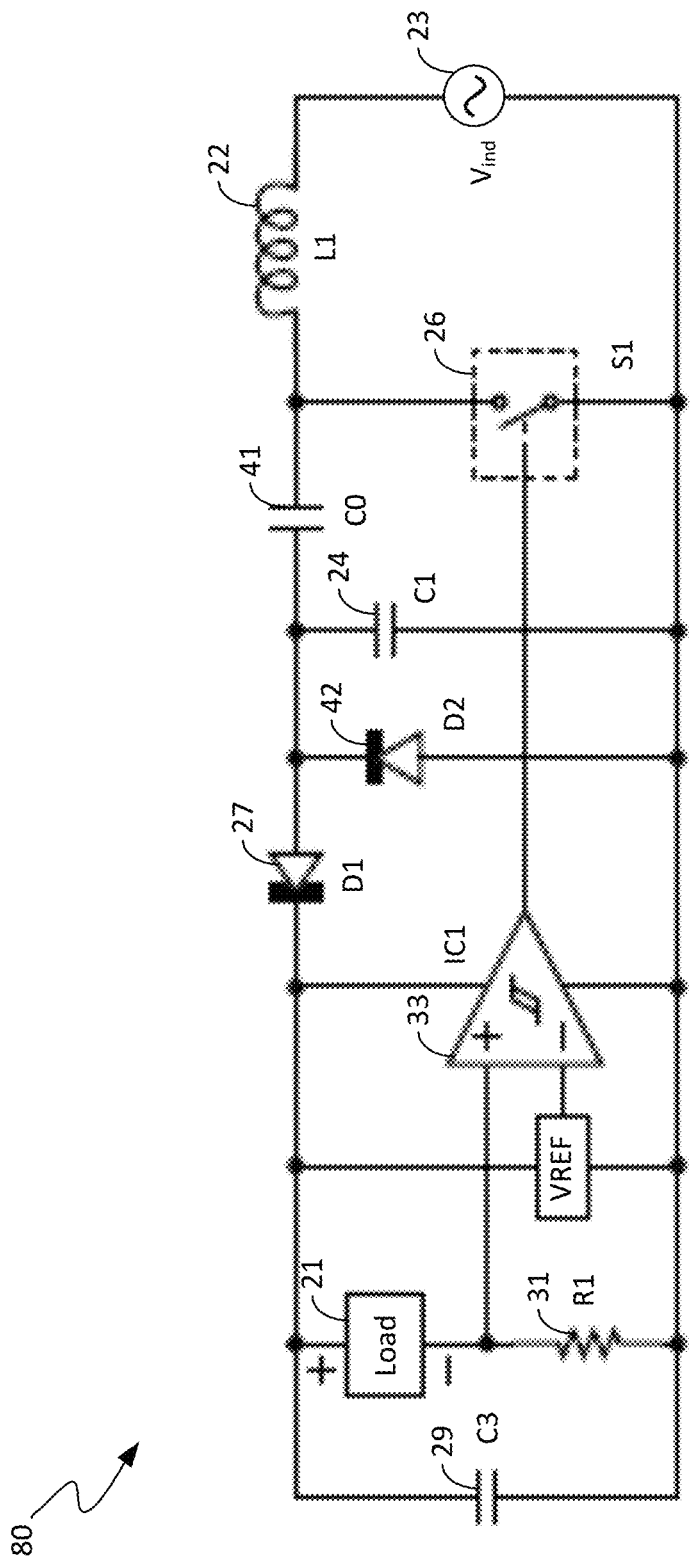
FIG. 10 is a schematic diagram of a wireless power receiver circuit in accordance with a representative embodiment that provides a constant DC current to the load of the wireless power receiver circuit.

The three PWM receiver circuits 20, 40 and 50 described above with reference to FIGS. 2, 5 and 7, respectively, are all designed to provide a constant DC voltage to the load 21. However, there are some situations in which a load requires a constant DC current instead of a constant DC voltage. FIGS. 8, 9 and 10 show wireless power PWM receiver circuits 60, 70 and 80, respectively, in accordance with representative embodiments that provide a constant DC current to the load 21.

In the PWM receiver circuits 60, 70 and 80 shown in FIGS. 8, 9 and 10, respectively, the load 21 is placed in series with the resistor R1 31. The comparator IC1 33 provides feedback that keeps the voltage across resistor R1 31 very close to the reference voltage, Vref. Because the current through resistor R1 31 is equal to the current through the load 21, these circuits will force the current through the load 21 to remain constant.

Figure 11:
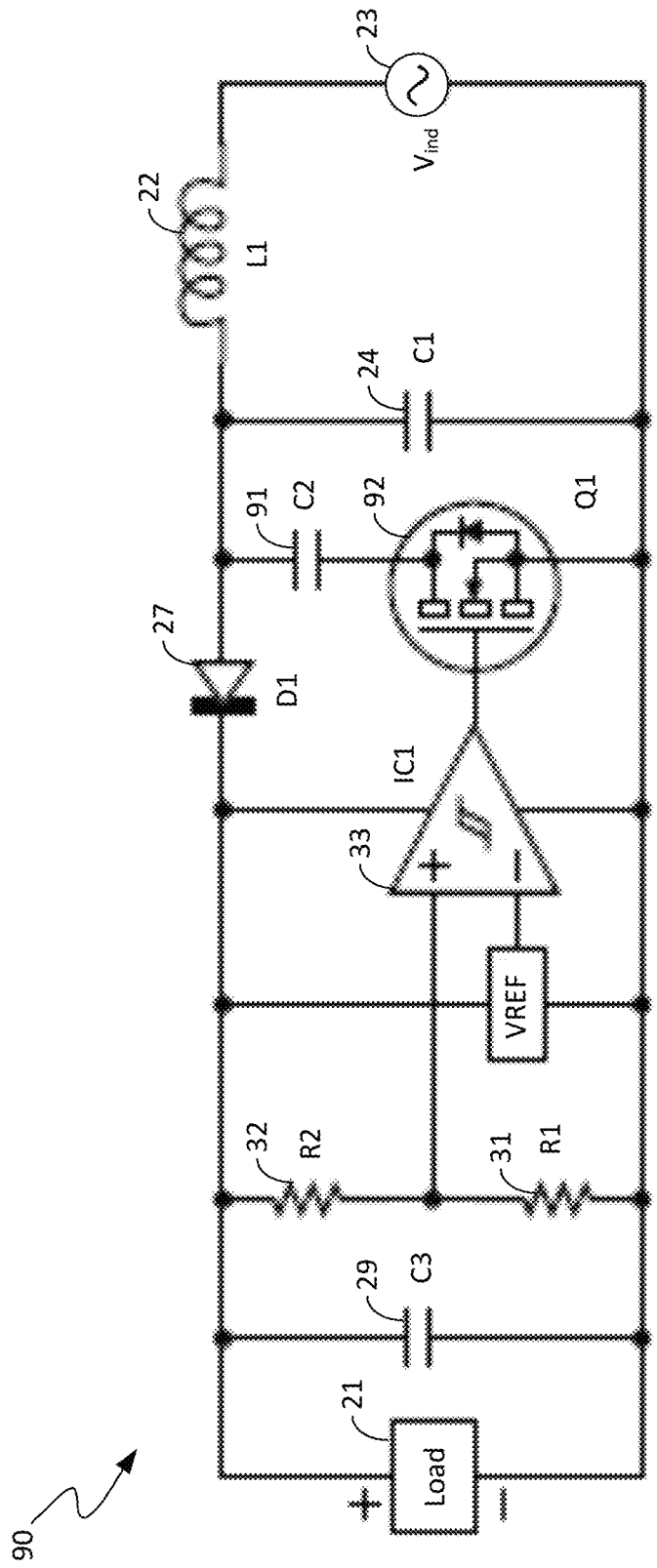
FIG. 11 is a schematic diagram of a wireless power receiver circuit in accordance with a representative embodiment that may be used to receive power wirelessly in a wireless power transfer system, and which uses n-channel MOSFET transistor as the electrically-controllable switch for shutting down the resonance response of the receiver circuit.
Figure 12:
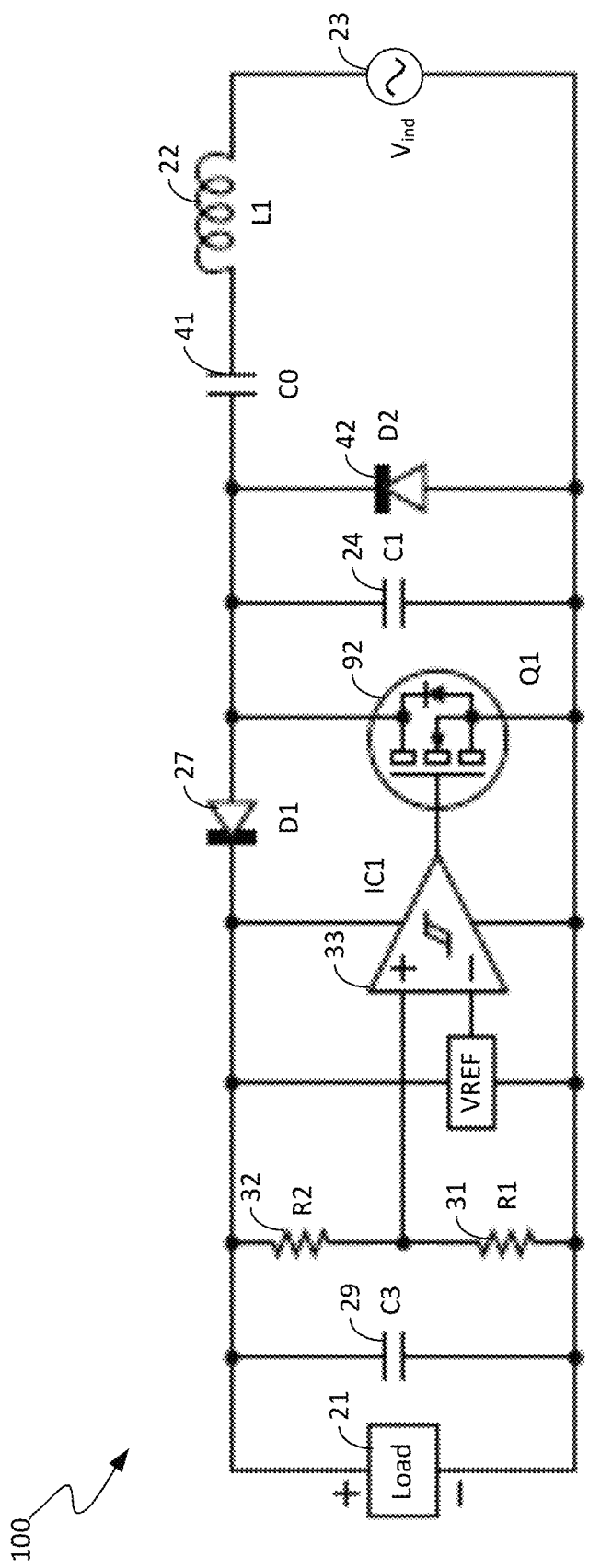
FIG. 12 is a schematic diagram of a wireless power receiver circuit in accordance with a representative embodiment that may be used to receive power wirelessly in a wireless power transfer system, and which uses n-channel MOSFET transistor as the electrically-controllable switch for shutting down the resonance response of the receiver circuit.
Figure 13:
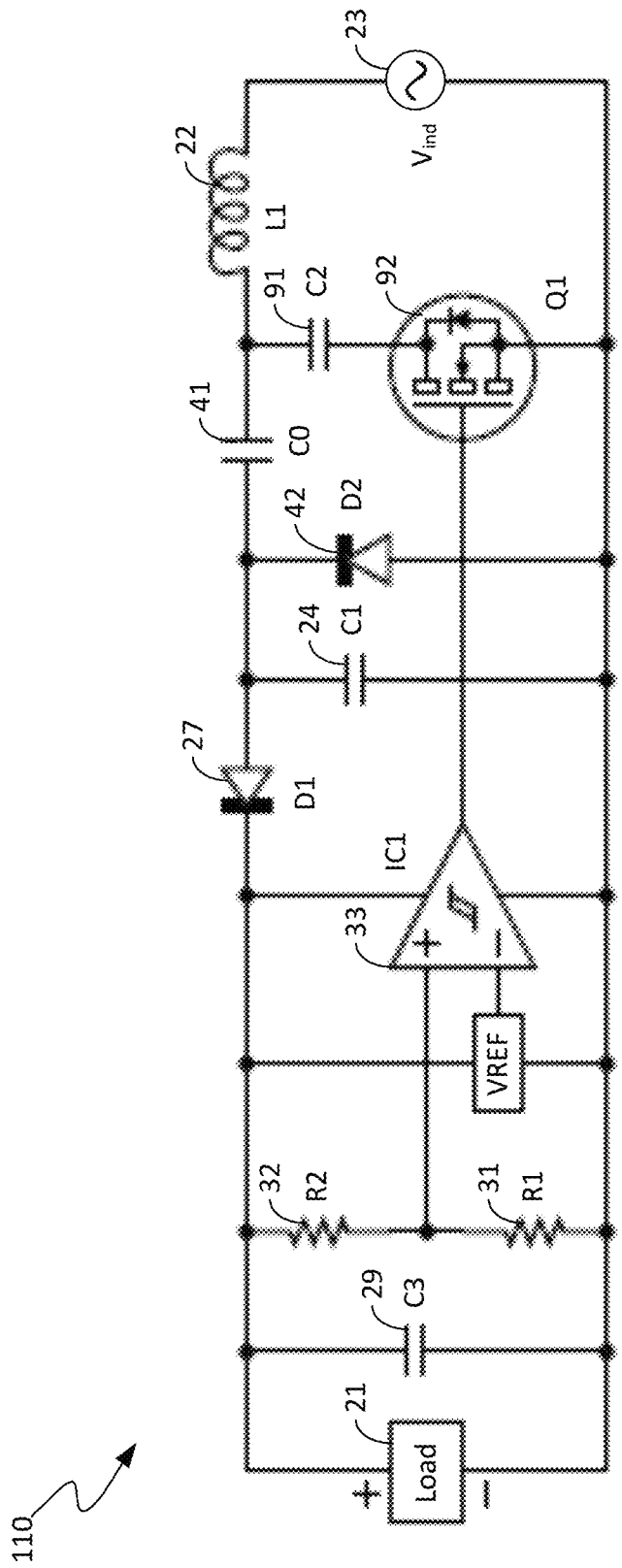
FIG. 13 is a schematic diagram of a wireless power receiver circuit in accordance with a representative embodiment that may be used to receive power wirelessly in a wireless power transfer system, and which uses n-channel MOSFET transistor as the electrically-controllable switch for shutting down the resonance response of the receiver circuit.

The electrically-controllable switch S1 26 shown in FIGS. 2, 5 and 7-10 may be implemented with, for example, an n-channel MOSFET transistor, Q1 92, as shown in the FIGS. 11, 12 and 13. FIGS. 11, 12 and 13 are schematic diagrams of wireless power PWM receiver circuits 90, 100 and 110, respectively, in accordance with a representative embodiment that may be used to receive power wirelessly in a wireless power transfer system. The PWM receiver circuits 90, 100 and 110 are very similar to the PWM receiver circuits shown in FIGS. 2, 5 and 7-10, except that the switch S1 26 has been replaced with the n-channel MOSFET transistor Q1 92. The operations of the receiver circuits 90, 100 and 110 are largely the same as the operation of the receiver circuit 20 shown in FIG. 2 to deliver a constant DC voltage to the load 21.

In the receiver circuits 90, 100 and 110, the n-channel MOSFET transistor Q1 92 plays the role of the electrically-controllable switch 9 described above with reference to FIG. 1. However, unlike an ideal switch, the MOSFET transistor Q1 92 can still conduct current when it is in its off-state due to the MOSFET's internal body diode, which points from the source to the drain. Therefore, in order for the MOSFET Q1 92 to operate as a switch, the voltage of the drain cannot be allowed to become more negative than one diode-drop below the voltage of the source. To achieve this condition, an additional capacitor, C2 91, has been placed in series with the MOSFET Q1 92 in the receiver circuits 90 and 110 shown in FIGS. 11 and 13, respectively. When the circuits are in the active state, the capacitor C2 91 builds up a DC charge that keeps the drain of MOSFET Q1 92 positive relative to the source. The value of the capacitor C2 91 should be chosen to be sufficiently large that it behaves as an RF short at the resonant frequency of the LC tank circuit.

The capacitor C2 91 is not used in the receiver circuit 100 shown in FIG. 12. In the receiver circuit 100, the capacitor C1 24 builds up a DC charge and plays the role that the capacitor C2 91 plays in the other two receiver circuits 90 and 110.

Figure 14:
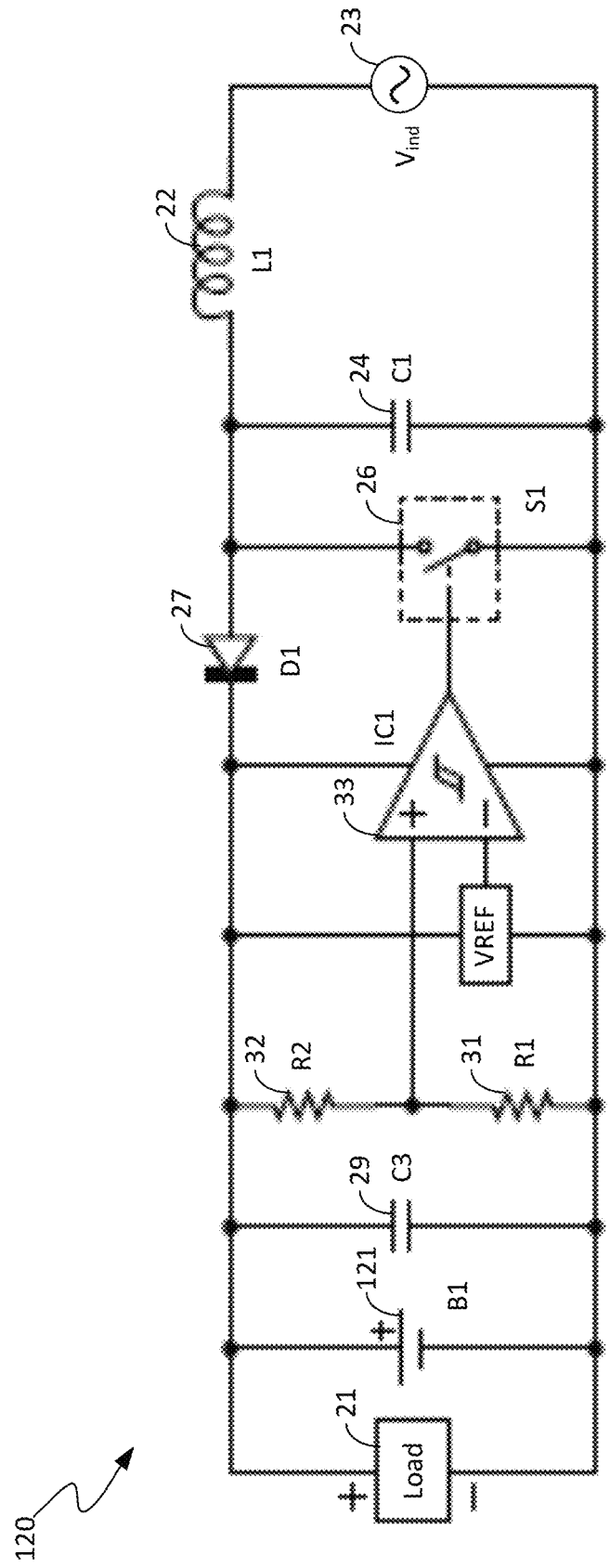
FIG. 14 is a schematic diagram of a wireless power receiver circuit in accordance with a representative embodiment that may be used to receive power wirelessly in a wireless power transfer system, and which includes a chargeable battery or electrochemical cell.

FIG. 14 is a schematic diagram of a wireless power PWM receiver circuit 120 in accordance with a representative embodiment that may be used to receive power wirelessly in a wireless power transfer system. The PWM receiver circuit 120 is identical to the PWM receiver circuit 20 shown in FIG. 2, except that the receiver circuit 120 includes a battery or electrochemical cell, represented by B1 121 in FIG. 14. The operation of the receiver circuit 120 is largely the same as the operation of the receiver circuit 20 shown in FIG. 2, except that the receiver circuit 120 charges the battery or electrochemical cell B1 121.

The battery or electrochemical cell B1 121 is in parallel with the capacitor C3 29 and effectively behaves like a very large capacitance. Consequently, the receiver circuit 120 can be made to have a very low PWM frequency. When the voltage of the battery or electrochemical cell B1 121 is low, the receiver circuit 120 is in the active state, and the battery or electrochemical cell B1 121 is continually charged with a constant DC current. The magnitude of the constant DC current depends on the amplitude of Vind, which is proportional to the strength of the ambient magnetic field. In stronger fields, the charging current will be higher, and the battery or electrochemical cell B1 121 will charge more quickly.

Once the voltage of the battery or electrochemical cell B1 121 becomes high enough to trigger the comparator, IC1 33, the electrically-controllable switch S1 26 is turned on, and the circuit 120 enters the idle state. When the receiver circuit 120 is in the idle state, the battery or electrochemical cell B1 121 continually discharges through the load 21, causing its voltage to drop. Once the voltage on the battery or electrochemical cell B1 121 drops by a certain amount, determined by the hysteresis of the comparator IC1 33, the electrically-controllable switch S1 26 is deactivated, and the circuit 120 re-enters the active state.

It should be noted that the constant-voltage PWM circuit topologies shown in FIGS. 2, 5 and 7 will all work equally well as battery charging circuits if the battery or electrochemical cell B1 121 is placed in parallel with the capacitor C3 29 in those circuits, and if the power level is chosen such that the DC charging current does not exceed the maximum allowable charging current for the battery or electrochemical cell B1 121.

Figure 15:
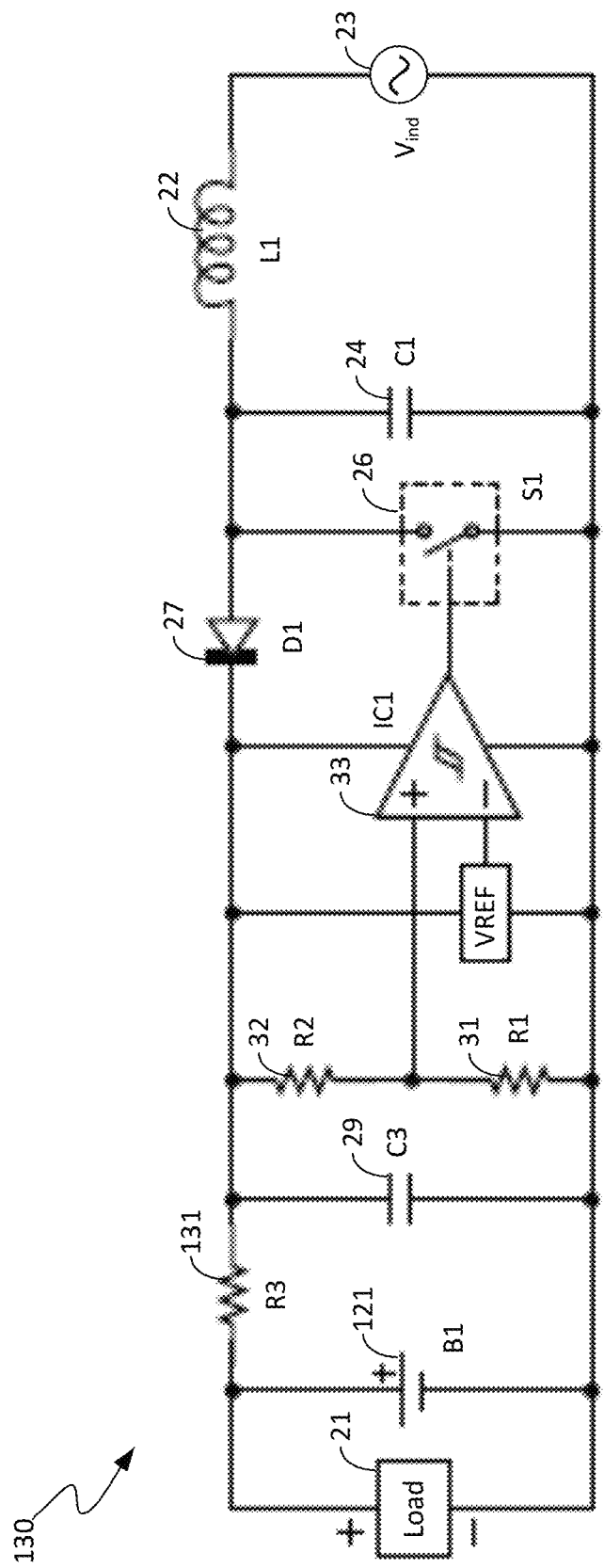
FIG. 15 is a schematic diagram of a wireless power receiver circuit in accordance with a representative embodiment that may be used to receive power wirelessly in a wireless power transfer system, and which includes a chargeable battery or electrochemical cell.

FIG. 15 is a schematic diagram of a wireless power PWM receiver circuit 130 in accordance with another representative embodiment that may be used to receive power wirelessly in a wireless power transfer system. In accordance with this representative embodiment, the receiver circuit 130 charges the battery or electrochemical cell B1 121 with a current-limiting resistor R3 131. If the DC charging current of the receiver circuit 120 shown in FIG. 14 exceeds the maximum allowed charging current for the battery or electrochemical cell B1 121, one option is to modify the circuit 120 by adding the current-limiting resistor R3 131 in series with the battery or electrochemical cell B1 121, as shown in FIG. 15.

The receiver circuit 130 shown in FIG. 15 has the additional benefit that the combination of the battery or electrochemical cell B1 121 and current-limiting resistor R3 131 behaves as a low-pass filter that substantially smoothes the voltage of the load 21 and eliminates the triangle-wave ripple on the load voltage shown in FIG. 4.

It should be noted that the PWM frequency of the receiver circuit 130 shown in FIG. 15 is determined by the value of the capacitor C3 29, unlike the receiver circuit 120 shown in FIG. 14, in which the PWM frequency is determined by the capacity of the battery or electrochemical cell B1 121. This means that the PWM frequency of the receiver circuit 130 shown in FIG. 15 can be much higher than the PWM frequency of the receiver circuit 120 shown in FIG. 14.

With reference again to FIG. 4, as indicated above, the periodic switching of the receiver circuit 20 causes a small triangle-wave ripple on the voltage across capacitor C3 29. The amplitude of this ripple is entirely set by the hysteresis of the comparator 33, and may be made smaller or larger by choosing a comparator with smaller or larger hysteresis, respectively. However, the hysteresis cannot be eliminated, as this hysteresis, in part, determines the frequency of the PWM. If the load 21 is connected in parallel with capacitor C3 29, then the load 21 will also have the same triangle-wave ripple on its voltage.

In some applications, this ripple may be undesirable. The receiver circuit 130 shown in FIG. 15 has the property that the combination of resistor R3 131 and the battery or electrochemical cell B1 121 act as a low-pass filter that smoothes the voltage across the load 21. The same effect may be achieved using a low-pass RC or LC filter without a battery, as will now be described with reference to FIGS. 16 and 17.

Figure 16:
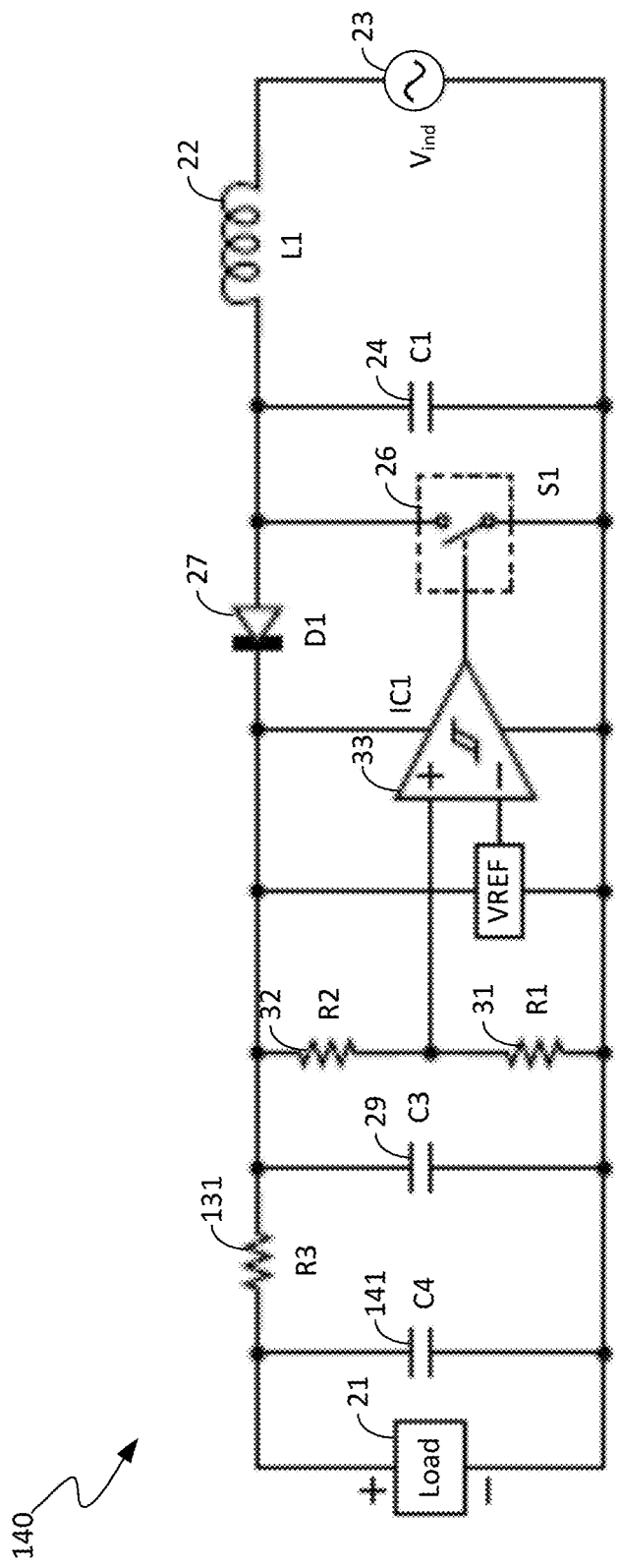
FIG. 16 is a schematic diagram of a wireless power receiver circuit in accordance with a representative embodiment that may be used to receive power wirelessly in a wireless power transfer system, and which include a low-pass RC circuit comprising a resistor R3 and capacitor C4 for reducing ripple in the load voltage.

FIG. 16 is a schematic diagram of a wireless power PWM receiver circuit 140 in accordance with a representative embodiment that may be used to receive power wirelessly in a wireless power transfer system. In accordance with this representative embodiment, the receiver circuit 140 includes a low-pass RC circuit comprising resistor R3 131 and capacitor C4 141. The low-pass RC circuit comprising resistor R3 131 and capacitor C4 141 reduces ripple in the load voltage.

Figure 17:
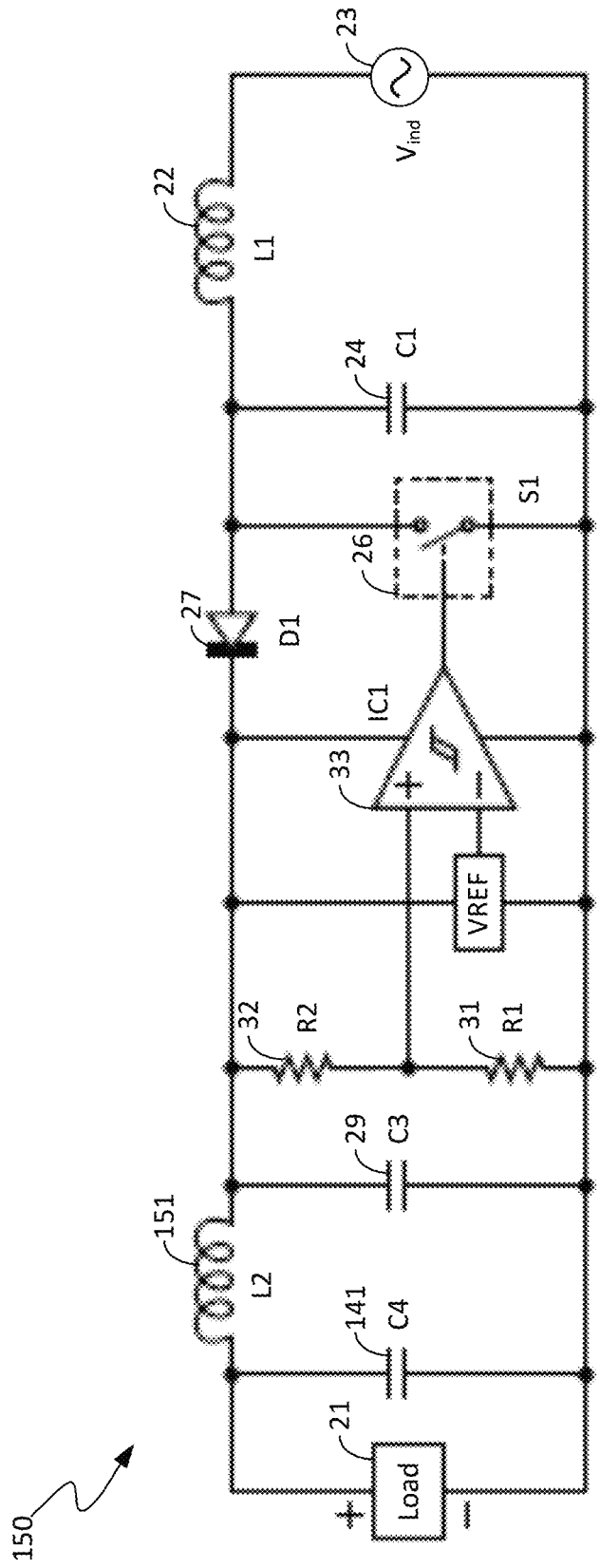
FIG. 17 is a schematic diagram of a wireless power PWM receiver circuit in accordance with a representative embodiment that may be used to receive power wirelessly in a wireless power transfer system, and which includes a low-pass LC circuit comprising a an inductor L2 and capacitor C4 for reducing ripple in the load voltage.

FIG. 17 is a schematic diagram of a wireless power PWM receiver circuit 150 in accordance with a representative embodiment that may be used to receive power wirelessly in a wireless power transfer system. In accordance with this representative embodiment, the receiver circuit 150 includes a low-pass LC circuit comprising inductor L2 151 and capacitor C4 141. The low-pass LC circuit comprising resistor inductor L2 151 and capacitor C4 141 reduces ripple in the load voltage.

Figure 18:
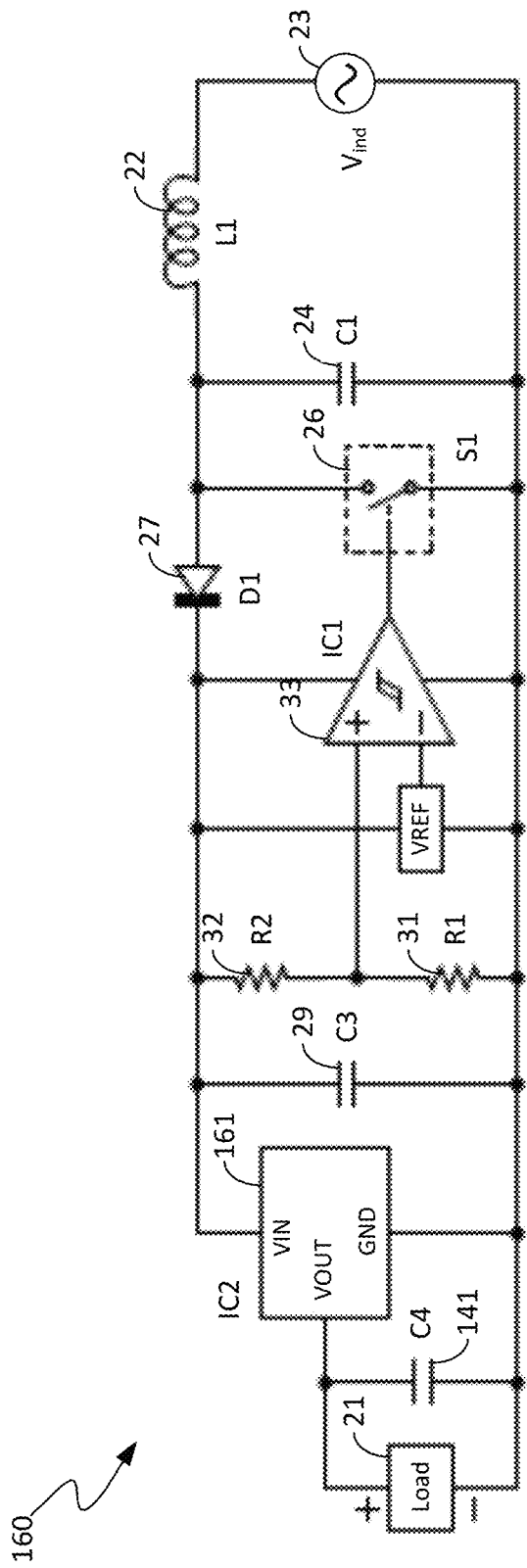
FIG. 18 is a schematic diagram of a wireless power receiver circuit in accordance with a representative embodiment that may be used to receive power wirelessly in a wireless power transfer system, and which includes a linear regulator IC2 for reducing ripple in the load voltage.

It is also possible to use a linear regulator to provide a constant voltage to the load, as will now be described with reference to FIG. 18. FIG. 18 is a schematic diagram of a wireless power PWM receiver circuit 160 in accordance with a representative embodiment that may be used to receive power wirelessly in a wireless power transfer system. In accordance with this representative embodiment, the receiver circuit 160 includes a linear regulator IC2 161 that reduces ripple in the load voltage.

It may be desirable in some applications to shut down the LC tank of the receiver circuit resonance at certain times or based on certain conditions. An example of the manner in which shutting down the LC tank of the receiver circuit can be performed will now be described with reference to FIG. 19.

Figure 19:
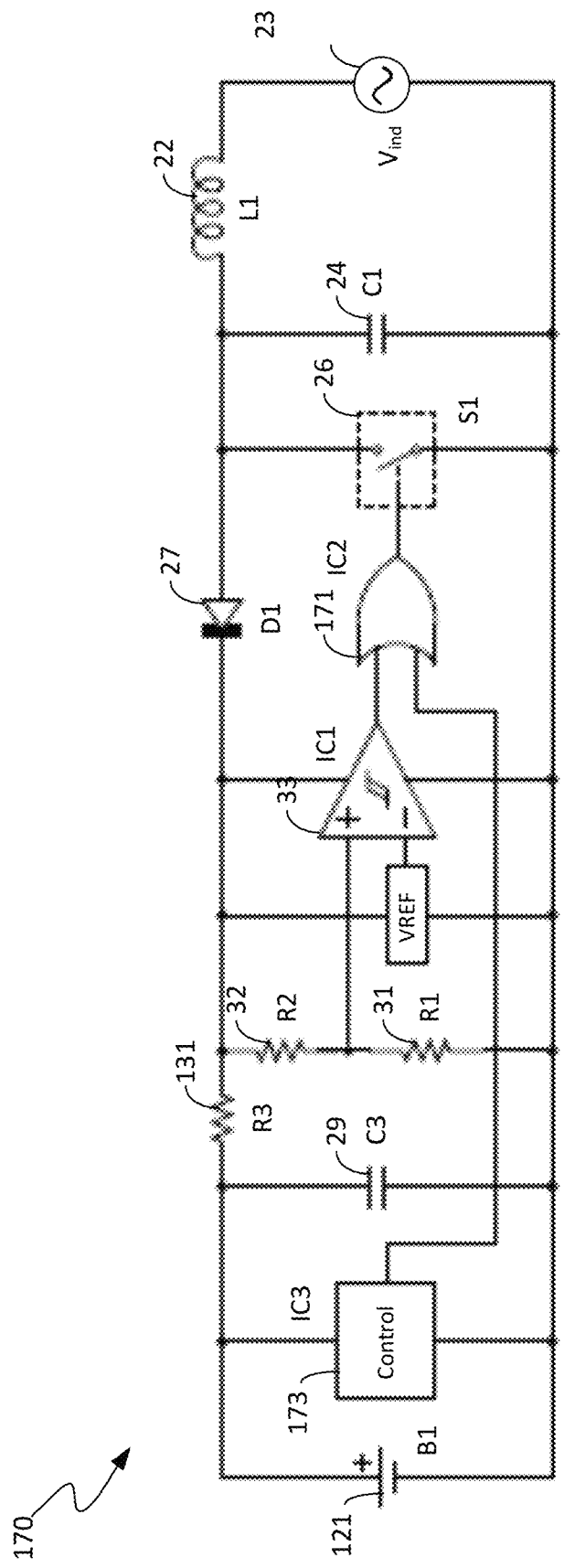
FIG. 19 is a schematic diagram of a wireless power PWM receiver circuit in accordance with a representative embodiment that may be used to receive power wirelessly in a wireless power transfer system, and which includes a control circuit configured to shut down the LC tank of the receiver circuit at certain times or based on certain conditions.

FIG. 19 is a schematic diagram of a wireless power PWM receiver circuit 170 in accordance with a representative embodiment that may be used to receive power wirelessly in a wireless power transfer system. In accordance with this representative embodiment, the receiver circuit 170 is configured to shut down the LC tank comprising inductor L1 22 and capacitor C1 24 to prevent receiver circuit resonance at certain times or based on certain conditions. The receiver circuit 170 has an OR-gate, IC2 171, which activates switch S1 26 whenever a logic-level high signal is received from the comparator, IC1 33, or from a control circuit IC3 173, which may be, for example, a microcontroller integrated circuit (IC) chip, an RF communications chip, an optical communications chip, a thermometer chip with a binary output based on a temperature threshold, etc.

Figure 20:
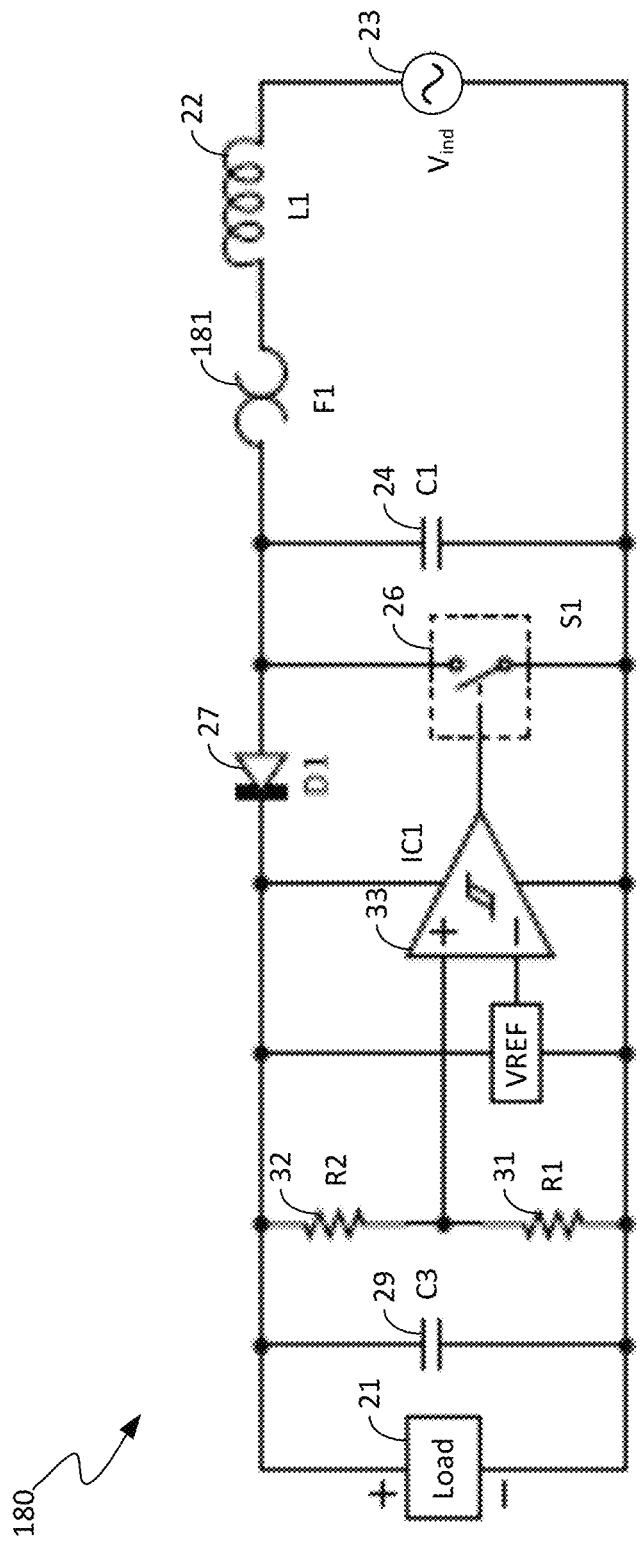
FIG. 20 is a schematic diagram of a wireless power receiver circuit for use in a wireless power transfer system in accordance with another representative embodiment, and which includes a thermal fuse or switch that prevents the LC tank of the receiver circuit from receiving power if a temperature exceeds some pre-determined threshold value.

In some situations, it is necessary or desirable to protect the PWM receiver circuit or load against excessive heat. For example, it is possible for the LC tank of the PWM receiver circuit to absorb power and generate excessive heat in the case where the circuit is exposed to an unusually high magnetic field strength, or in the case of failure of the comparator IC1 33. FIG. 20 is a is a schematic diagram of a wireless power PWM receiver circuit 180 for use in a wireless power transfer system in accordance with another representative embodiment that provides such thermal protection. A thermal fuse, F1 181, is placed in series with the resonant LC tank circuit comprising capacitor C1 24 and inductor L1 22. When the fuse F1 181 is exposed to a temperature exceeding some pre-determined threshold (TH) value, it becomes an open-circuit (placed in the off state), thereby preventing the LC tank circuit from receiving any power. When the fuse F1 181 is in the off state, the resonant response of the resonant circuit is shut down such that the receiver circuit 180 receives only a minimum amount, if any, of electrical power. Otherwise, the fuse F1 181 is in a PWM state.

In some cases, the thermal fuse F1 181 may be replaced by a thermal switch that returns to normal operation once the temperature has fallen below the pre-determined TH value. Thus, element 181 represents a thermal fuse or a thermal switch. It should be noted that the thermal fuse or switch F1 181 may be placed in series with the LC tank circuit in any of the PWM topologies described above with reference to FIGS. 2, 5 and 7-19.

Figure 21:
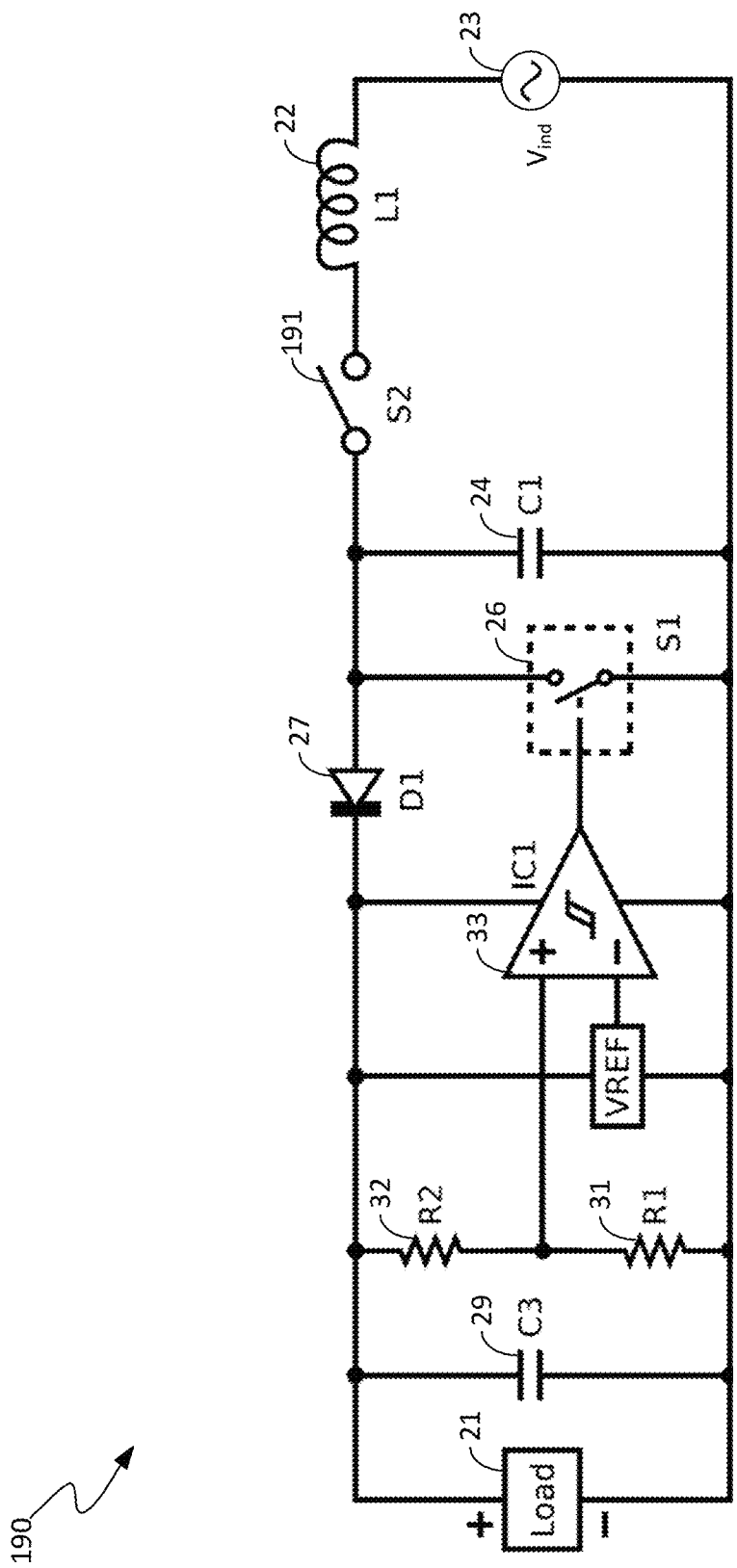
FIG. 21 is a schematic diagram of a wireless power receiver circuit for use in a wireless power transfer system in accordance with another representative embodiment, and which includes a user-controllable switch that can be turned on and off by the user to allow the user to activate and deactivate the receiver circuit.

FIG. 21 is a schematic diagram of a wireless power receiver circuit 190 for use in a wireless power transfer system in accordance with another representative embodiment, and which includes a user-controllable switch S2 191 that can be turned on and off by the user to allow the user to activate and deactivate the receiver circuit 190. In all other respects, the receiver circuit 190 is identical to the receiver circuit 20 shown in FIG. 2. When the switch S2 191 is open (placed in the off state), the resonant response of the receiver circuit 190 is shut down such that the receiver circuit 190 is incapable of receiving any power, regardless of the strength of the ambient magnetic field. The receiver circuit 190 is therefore rendered safe, or protected, from any sort of over-voltage or over-temperature fault when the switch S2 191 is in the off position shown in FIG. 21.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A wireless power receiver circuit for use in a wireless power transfer system, the wireless power receiver circuit comprising:
   a resonator circuit configured to resonate at a frequency of an ambient magnetic field generated by a wireless power transmitter of the wireless power transfer system when the wireless power receiver circuit is in an active state and to output a radio frequency (RF) output signal, the resonator circuit comprising an electrically-controllable switch that is controllable by a control signal to cause the resonator circuit to switch from a first state to a second state, and vice versa;
   an alternating current (AC)-to-direct current (DC) rectifier circuit, the RF output signal output from the resonator circuit being input to the AC-to-DC rectifier circuit, the AC-to-DC rectifier circuit converting the RF output signal into a DC power signal and outputting the DC power signal;
   a DC load circuit having a DC load and an energy storage device, wherein during the active state the DC power signal output by the AC-to-DC rectifier circuit charges the energy storage device, causing a substantially constant DC current or voltage, depending on which is used by the DC load, to be delivered to the DC load; and
   a comparator circuit that receives an output signal output from the DC load circuit, compares the received output signal with a preselected reference voltage signal and generates the control signal, the control signal being fed back to the resonator circuit to control the state of the electrically-controllable switch, wherein the comparator circuit exhibits a preselected amount of hysteresis that determines a predetermined amount below the preselected reference voltage signal that the output signal output from the DC load circuit drops before the comparator circuit outputs the control signal.

2. The wireless power receiver circuit of claim 1, wherein the first and second states of the electrically-controllable switch are closed and opened states, respectively, of the electrically-controllable switch, wherein switching the resonator circuit from the closed state to the opened state causes the wireless power receiver circuit to switch from an idle state to the active state, and vice versa, and wherein a resonant response of the resonator circuit is shut down when the wireless power receiver circuit is in the idle state, and wherein when the wireless power receiver circuit is in the idle state, a minimum amount of electrical power is received by the wireless power receiver circuit.

3. The wireless power receiver circuit of claim 2, wherein when the output signal output from the DC load circuit has dropped to a value that is a predetermined amount below the preselected reference voltage signal, the control signal generated by the comparator circuit has a low value that causes the electrically-controllable switch to switch from the closed state to the opened state, thereby placing the wireless power receiver circuit in the active state.

4. The wireless power receiver circuit of claim 1, wherein the preselected amount of hysteresis is preselected to delay switching of the wireless power receiver circuit from the idle state to the active state, and wherein the delay ensures that the switching of the wireless power receiver circuit is at a frequency that is lower than the frequency of the ambient magnetic field.

5. The wireless power receiver circuit of claim 1, wherein when the energy storage device is fully charged, the wireless power receiver circuit switches from the active state to an idle state, and wherein when the wireless power receiver circuit is in the idle state, the resonator circuit is shut down and has no resonant response to the ambient magnetic field, and wherein when an electrical charge on the energy storage device drops below a predetermined level, the wireless power receiver circuit switches from the idle state to the active state, and wherein when the wireless power receiver circuit is in the active state, the resonator circuit has a resonant response to the ambient magnetic field.

6. The wireless power receiver circuit of claim 5, wherein the resonator circuit comprises at least a first capacitor and a first inductor connected in series with one another.

7. The wireless power receiver circuit of claim 6, wherein the electrically-controllable switch is connected in parallel with the first capacitor.

8. The wireless power receiver circuit of claim 5, wherein the resonator circuit comprises at least a first capacitor and a first inductor connected in series with one another and a second capacitor connected in parallel with the electrically-controllable switch.

9. The wireless power receiver circuit of claim 1, wherein the AC-to-DC rectifier circuit comprises a first rectifier diode, wherein the resonator circuit comprises at least a first capacitor and a first inductor connected in series with one another and a second capacitor connected in parallel with the electrically-controllable switch, the wireless power receiver circuit further comprising:
   a second rectifier diode connected in parallel with the second capacitor and the electrically-controllable switch.

10. The wireless power receiver circuit of claim 1, wherein the DC load circuit further comprises: a resistor network comprising at least one resistor, the resistor network being connected to an output node of the DC load circuit and to at least one of the DC load and the energy storage device.

11. The wireless power receiver circuit of claim 10, wherein the DC load circuit further comprises: a battery or electrochemical cell connected in parallel with the DC load.

12. The wireless power receiver circuit of claim 11, wherein the DC load circuit further comprises: a capacitor connected in parallel with the DC load.

13. The wireless power receiver circuit of claim 12, wherein the DC load circuit further comprises: a resistor connected in series with the battery or electrochemical cell.

14. The wireless power receiver circuit of claim 10, wherein the DC load circuit further comprises: a low-pass resistor-capacitor (RC) filter connected in series with the DC load.

15. The wireless power receiver circuit of claim 10, wherein the DC load circuit further comprises: a low-pass inductor-capacitor (LC) filter connected in series with the DC load.

16. The wireless power receiver circuit of claim 10, wherein the DC load circuit further comprises: a linear regulator having an input terminal that is connected to the resistor network and having an output terminal that is connected to the DC load.

17. The wireless power receiver circuit of claim 16, wherein the DC load circuit further comprises: at least a first capacitor connected in parallel with the DC load.

18. The wireless power receiver circuit of claim 10, further comprising:
a control circuit electrically coupled to the electrically-controllable switch, the control circuit being configured to detect if a predetermined event or condition has occurred and to cause the electrically-controllable switch to be placed in the first state upon detecting that the predetermined event or condition has occurred.

19. The wireless power receiver circuit of claim 10, further comprising:
a fuse or switch connected in line in the resonator circuit, wherein the fuse or switch is configured to create an open circuit in the resonator circuit if a temperature exceeds a predetermined temperature to cause the wireless power receiver circuit to switch from a pulse width modulation (PWM) state to an off state, and wherein a resonant response of the resonator circuit is shut down when the wireless power receiver circuit is in the off state, and wherein when the wireless power receiver circuit is in the off state, a minimum amount of electrical power is received by the wireless power receiver circuit.

20. The wireless power receiver circuit of claim 10, further comprising:
a user-controllable switch connected in line in the resonator circuit, wherein the user-controllable switch can be turned on and off by the user to allow the user to switch the wireless power receiver circuit from a pulse width modulation (PWM) state to an off state, and vice versa, wherein a resonant response of the resonator circuit is shut down when the wireless power receiver circuit is in the off state, and wherein when the wireless power receiver circuit is in the off state, a minimum amount of electrical power is received by the wireless power receiver circuit.

21. A method for receiving wireless power in a wireless power transfer system, the wireless power receiver circuit comprising:
with a resonator circuit of a wireless power receiver circuit, operating in an active state or in an idle state, wherein in the active state, the resonator circuit resonates at a frequency of an ambient magnetic field generated by a wireless power transmitter of the wireless power transfer system and outputs a radio frequency (RF) output signal, the resonator circuit comprising an electrically-controllable switch that is controllable by a control signal to cause the resonator circuit to switch from a first state during which the resonator circuit is in the idle state to a second state during which the resonator circuit is operating in the active state, and vice versa;
with an alternating current (AC)-to-direct current (DC) rectifier circuit, converting the RF output signal into a DC power signal and outputting the DC power signal;
with a DC load circuit having a DC load and an energy storage device, charging the energy storage device when the resonator circuit is in the active state to cause a substantially constant DC current or voltage, depending on which is used by the DC load, to be delivered to the DC load; and
with a comparator circuit, receiving an output signal output from the DC load circuit, comparing the received output signal with a preselected reference voltage signal, generating the control signal, and feeding the control signal back to the resonator circuit to control the state of the electrically-controllable switch, the comparator circuit exhibiting a preselected amount of hysteresis that determines a predetermined amount below the preselected reference voltage signal that the output signal output from the DC load circuit drops before the comparator circuit outputs the control signal.

22. A system, comprising:
a wireless power receiver circuit for use in a wireless power transfer system, the wireless power receiver circuit comprising:
a resonator circuit configured to resonate at a frequency of an ambient magnetic field generated by a wireless power transmitter of the wireless power transfer system when the wireless power receiver circuit is in an active state and to output a radio frequency (RF) output signal, the resonator circuit comprising an electrically-controllable switch that is controllable by a control signal to cause the resonator circuit to switch from a first state to a second state, and vice versa, the resonator circuit further comprising at least a first capacitor and a first inductor connected in series with one another and a second capacitor connected in parallel with the electrically-controllable switch;
an alternating current (AC)-to-direct current (DC) rectifier circuit, the RF output signal output from the resonator circuit being input to the AC-to-DC rectifier circuit, the AC-to-DC rectifier circuit converting the RF output signal into a DC power signal and outputting the DC power signal, wherein the AC-to-DC rectifier circuit comprises a first rectifier diode;
a second rectifier diode connected in parallel with the second capacitor and the electrically-controllable switch of the resonator circuit;
a DC load circuit having a DC load and an energy storage device, wherein during the active state the DC power signal output by the AC-to-DC rectifier circuit charges the energy storage device, causing a substantially constant DC current or voltage, depending on which is used by the DC load, to be delivered to the DC load; and
a comparator circuit that receives an output signal output from the DC load circuit, compares the received output signal with a preselected reference voltage signal and generates the control signal, the control signal being fed back to the resonator circuit to control the state of the electrically-controllable switch.

23. The system of claim 22, wherein the system further comprises the wireless power transfer system.

24. A wireless power receiver circuit, comprising:
a resonator circuit configured to resonate at a frequency of an ambient magnetic field generated by a wireless power transmitter of the wireless power transfer system when the wireless power receiver circuit is in an active state and to output a radio frequency (RF) output signal, the resonator circuit comprising an electrically-controllable switch that is controllable by a control signal to cause the resonator circuit to switch from a first state to a second state, and vice versa;
an alternating current (AC)-to-direct current (DC) rectifier circuit, the RF output signal output from the resonator circuit being input to the AC-to-DC rectifier circuit, the AC-to-DC rectifier circuit converting the RF output signal into a DC power signal and outputting the DC power signal;
a DC load circuit comprising a DC load and an energy storage device, wherein during the active state the DC power signal output by the AC-to-DC rectifier circuit charges the energy storage device causing a substantially constant DC current or voltage, depending on which is used by the DC load, to be delivered to the DC load, wherein the DC load circuit further comprises:
   a resistor network comprising at least one resistor, the resistor network being connected to an output node of the DC load circuit and to at least one of the DC load and the energy storage device;
   a battery or electrochemical cell connected in parallel with the DC load;
   a capacitor connected in parallel with the DC load; and
   a resistor connected in series with the battery or electrochemical cell; and
a comparator circuit that receives an output signal output from the DC load circuit, compares the received output signal with a preselected reference voltage signal and generates the control signal, the control signal being fed back to the resonator circuit to control the state of the electrically-controllable switch.

25. A wireless power receiver circuit for use in a wireless power transfer system, the wireless power receiver circuit comprising:
   a resonator circuit configured to resonate at a frequency of an ambient magnetic field generated by a wireless power transmitter of the wireless power transfer system when the wireless power receiver circuit is in an active state and to output a radio frequency (RF) output signal, the resonator circuit comprising an electrically-controllable switch that is controllable by a control signal to cause the resonator circuit to switch from a first state to a second state, and vice versa;
   an alternating current (AC)-to-direct current (DC) rectifier circuit, the RF output signal output from the resonator circuit being input to the AC-to-DC rectifier circuit, the AC-to-DC rectifier circuit converting the RF output signal into a DC power signal and outputting the DC power signal;
   a DC load circuit having a DC load and an energy storage device, wherein during the active state the DC power signal output by the AC-to-DC rectifier circuit charges the energy storage device, causing a substantially constant DC current or voltage, depending on which is used by the DC load, to be delivered to the DC load, wherein the DC load circuit further comprises:
     a resistor network comprising at least one resistor, the resistor network being connected to an output node of the DC load circuit and to at least one of the DC load and the energy storage device; and
     a linear regulator having an input terminal that is connected to the resistor network and having an output terminal that is connected to the DC load; and
a comparator circuit that receives an output signal output from the DC load circuit, compares the received output signal with a preselected reference voltage signal and generates the control signal, the control signal being fed back to the resonator circuit to control the state of the electrically-controllable switch.

* * * * *